(12) United States Patent
Liang et al.

(10) Patent No.: US 10,796,073 B2
(45) Date of Patent: Oct. 6, 2020

(54) NETWORK ARTICLE COMMENT PROCESSING METHOD AND APPARATUS, USER TERMINAL DEVICE, SERVER AND NON-TRANSITORY MACHINE-READABLE STORAGE MEDIUM

(71) Applicant: GUANGZHOU UCWEB COMPUTER TECHNOLOGY CO., LTD., Guangzhou (CN)

(72) Inventors: Jie Liang, Guangzhou (CN); Xiaozhen Wang, Guangzhou (CN); Jinhe Zeng, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 69 days.

(21) Appl. No.: 15/881,229

(22) Filed: Jan. 26, 2018

(65) Prior Publication Data
US 2018/0150437 A1    May 31, 2018

Related U.S. Application Data

(63) Continuation of application No. PCT/CN2016/082725, filed on May 20, 2016.

(30) Foreign Application Priority Data

Jul. 27, 2015   (CN) .......................... 2015 1 0452495

(51) Int. Cl.
*G06F 40/106*   (2020.01)
*G06F 16/93*   (2019.01)
(Continued)

(52) U.S. Cl.
CPC ............ *G06F 40/106* (2020.01); *G06F 16/93* (2019.01); *G06F 16/9577* (2019.01);
(Continued)

(58) Field of Classification Search
CPC ............................ G06F 17/241; G06F 40/169
See application file for complete search history.

(56) References Cited

U.S. PATENT DOCUMENTS 8,640,023 B1 *   1/2014   Murray ................. G06F 16/954
715/232
2005/0289452 A1 *   12/2005   Kashi ................. G06F 17/2247
715/232
(Continued)

FOREIGN PATENT DOCUMENTS

CN   102779170   11/2012
CN   104094251   10/2014
(Continued)

OTHER PUBLICATIONS

International Preliminary Report on Patentability Chapter I for Application No. PCT/CN2016/082725 dated Feb. 8, 2018 (12 pages).
(Continued)

*Primary Examiner* — Asher D Kells
(74) *Attorney, Agent, or Firm* — Sheppard Mullin Richter & Hampton LLP

(57) ABSTRACT

A network article comment processing method and apparatus, a user terminal device, a server, and a non-transitory machine-readable storage medium provided in the present disclosure belong to the technical field of communication. The method includes: obtaining, by a client in a process of displaying a current article, a location where user specified content in the article is located with respect to all the pages occupied by the article; obtaining comment content posted by the user for the user specified content; and sending the comment content and the location at which the user specified content corresponding to the comment content is located with respect to all the pages occupied by the article to a server. In the present disclosure, the user does not need to (Continued)

post or view the comment content at the bottom of the article, the comment content may be displayed at a location at which the user specified content corresponding to the comment content is located with respect to all the pages occupied by the article, and the article and the comment are closely related, which facilitates reading.

9 Claims, 20 Drawing Sheets

(51) Int. Cl.
*G06F 16/958* (2019.01)
*G06F 16/957* (2019.01)
*G06F 40/14* (2020.01)
*G06F 40/169* (2020.01)
*G06F 40/279* (2020.01)
*G06F 3/0484* (2013.01)
*G06F 3/0488* (2013.01)
*H04L 29/08* (2006.01)

(52) U.S. Cl.
CPC ............ *G06F 16/986* (2019.01); *G06F 40/14* (2020.01); *G06F 40/169* (2020.01); *G06F 3/04842* (2013.01); *G06F 3/04883* (2013.01); *G06F 40/279* (2020.01); *H04L 67/02* (2013.01)

(56) References Cited

U.S. PATENT DOCUMENTS

| | | | | |
|---|---|---|---|---|
| 2006/0048046 A1* | 3/2006 | Joshi | ................... | G06F 40/169 |
| | | | | 715/230 |
| 2009/0199083 A1* | 8/2009 | Sar | ...................... | G06F 16/9558 |
| | | | | 715/231 |
| 2010/0011282 A1* | 1/2010 | Dollard | ................. | G06F 17/241 |
| | | | | 715/233 |
| 2011/0066636 A1* | 3/2011 | Guido | ................. | G06F 3/04842 |
| | | | | 707/769 |
| 2011/0066957 A1* | 3/2011 | Prats | ..................... | G06F 17/241 |
| | | | | 715/753 |
| 2013/0080871 A1* | 3/2013 | Howarth | ............... | G06F 16/958 |
| | | | | 715/230 |
| 2013/0145249 A1* | 6/2013 | Harper | .................. | G06F 17/241 |
| | | | | 715/230 |
| 2013/0191720 A1 | 7/2013 | Simons et al. | | |
| 2015/0169511 A1 | 6/2015 | Chen | | |
| 2015/0286624 A1 | 10/2015 | Simons et al. | | |

FOREIGN PATENT DOCUMENTS

| | | |
|---|---|---|
| CN | 104504131 A | 4/2015 |
| CN | 104571818 | 4/2015 |

OTHER PUBLICATIONS

First Search for Chinese Application No. 201510452495.6 dated Mar. 11, 2019 (1 pages).

First Office Action for Chinese Application No. 201510452495.6 dated Mar. 11, 2019 with English machine translation (20 pages).

International Search Report and Written Opinion for Application No. PCT/CN2016/082725, dated Aug. 25, 2016, 8 pages.

* cited by examiner

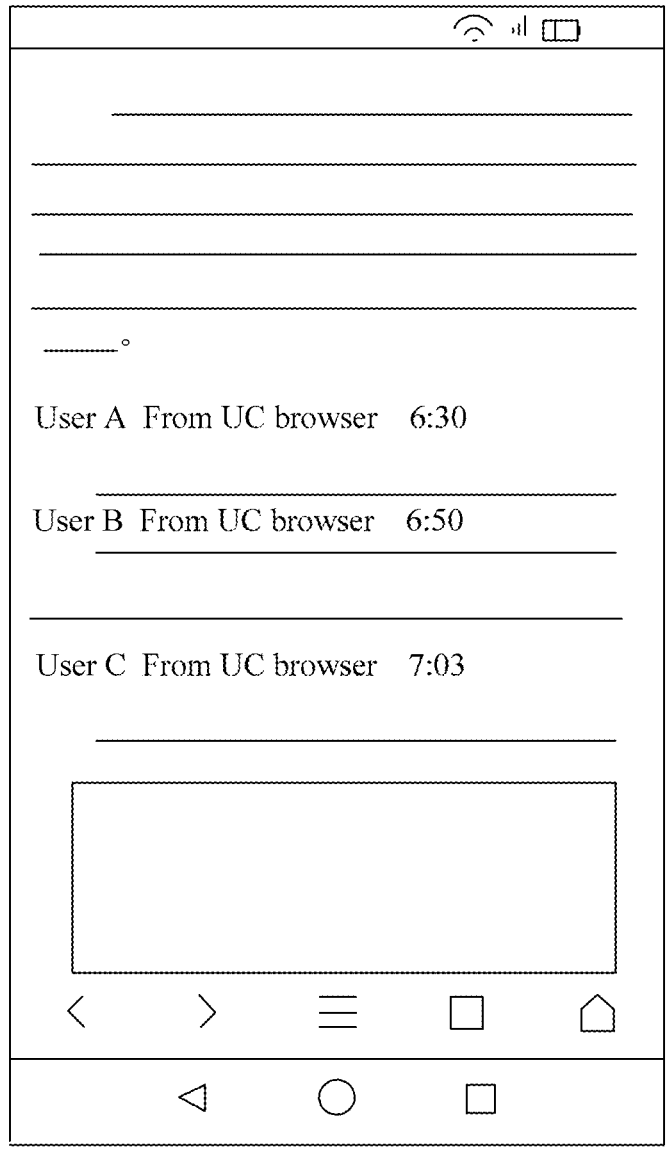

FIG. 12

| A server receives comment content and a location at which specified content corresponding to the comment content is located on all pages occupied by an article, where the comment content and the location are sent by at least one client | S601 |

| Store the comment content and the location at which the specified content corresponding to the comment content is located with respect to all the pages occupied by the article | S602 |

FIG. 13

NETWORK ARTICLE COMMENT PROCESSING METHOD AND APPARATUS, USER TERMINAL DEVICE, SERVER AND NON-TRANSITORY MACHINE-READABLE STORAGE MEDIUM

CROSS-REFERENCE TO RELATED APPLICATIONS

This application is a continuation application of International Application No. PCT/CN2016/082725, filed on May 20, 2016, which is based on and claims priority to and benefits of Chinese Patent Application No. 201510452495.6, filed with the State Intellectual Property Office (SIPO) of the People's Republic of China on Jul. 27, 2015. The entire contents of the above-identified application are incorporated herein by reference.

TECHNICAL FIELD

The present disclosure relates to the technical field of mobile communication, and specifically, to a network article comment processing method and apparatus, a user terminal device, a server, and a non-transitory machine-readable storage medium.

BACKGROUND

As mobile terminals are constantly popularized and developed, Internet access by using browsers of mobile terminals gradually becomes a trend. Currently, an article, for example, a popular article on a smartphone portal site, has gradually increasing comments on many mobile terminals. This means that users not only intend to read articles in demand, but also hope to share, with more people, their own thoughts in reading the articles.

Limited by various technologies and ideas, currently, comments on an article are all placed at the bottom of the article. As a result, a user reading the article needs to finish reading the entire article before moving to the bottom comment area to read comments; or needs to directly jump to the comment area to read comments by skipping content of the main body of the article. It is found in researches that, most comments are related to specified content of the article, and when the article is read in the foregoing two manners, the article and comments are not closely related, and reading convenience needs to be further improved.

SUMMARY

An objective of the present disclosure is to provide a network article comment processing method and apparatus, a user terminal device, a server, and a non-transitory machine-readable storage medium applicable to a mobile terminal, to resolve the existing problem that comments are all placed at the bottom of an article and the article and comments are not closely related in the mobile terminal, and reading convenience needs to be further improved.

To achieve the objective, the following technical solutions are used in embodiments of the present disclosure:

According to a first aspect, an embodiment of the present disclosure provides a network article comment processing method, including:

obtaining, by a client in a process of displaying a current article, a location where user specified content in the article is located with respect to all the pages occupied by the article;

obtaining comment content posted by the user for the specified content; and sending the comment content and the location at which the specified content corresponding to the comment content is located on all the pages occupied by the article to a server.

With reference to the first aspect, an embodiment of the present disclosure provides a first possible implementation of the first aspect, where the obtaining, by a client in a process of displaying a current article, a location where user specified content in the article is located with respect to all the pages occupied by the article includes:

detecting, by the client in the process of displaying the current article, an operation gesture of the user for the article, where the operation gesture is used to select the specified content;

obtaining coordinates that are of the specified content selected by the user by using the operation gesture and that are on a current page, and coordinates of the current page on all the pages occupied by the article; and according to the coordinates that are of the specified content and that are on the current page and the coordinates of the current page on all the pages occupied by the article, positioning, in a DOM tree of all the pages occupied by the article, a DOM node corresponding to the specified content.

According to a second aspect, an embodiment of the present disclosure further provides a network article comment processing method, including:

obtaining, by a client, a to-be-displayed article and comment content of the article from a server, where the comment content includes comment content corresponding to location information, and the location information defines a location at which specified content corresponding to the comment content is located with respect to all pages occupied by the article;

finding comment content corresponding to the location information from the comment content;

finding, from all the pages occupied by the article and according to the location information corresponding to the found comment content, a location at which specified content corresponding to the comment content is located on all the pages occupied by the article; and displaying the comment content at the found location.

With reference to the second aspect, an embodiment of the present disclosure provides a first possible implementation of the second aspect, where the location at which the specified content corresponding to the comment content is located on all the pages occupied by the article is:

a DOM node that corresponds to the specified content corresponding to the comment content and that is in a DOM tree of all the pages occupied by the article; and the finding, from all the pages occupied by the article and according to the location information corresponding to the found comment content, a location at which specified content corresponding to the comment content is located on all the pages occupied by the article includes:

finding, from all the pages occupied by the article and according to the location information corresponding to the found comment content, the DOM node that corresponds to the specified content corresponding to the comment content and that is in the DOM tree of all the pages occupied by the article.

According to a third aspect, an embodiment of the present disclosure further provides a network article comment processing method, including:

receiving, by a server, comment content and a location at which specified content corresponding to the comment content is located on all pages occupied by an article, where the comment content and the location are sent by at least one client; and storing the comment content and the location at which the specified content corresponding to the comment content is located on all the pages occupied by the article.

With reference to the third aspect, an embodiment of the present disclosure provides a first possible implementation of the third aspect, where the server pre-stores the article, and the method further includes:

responding to a comment content obtaining request sent by the client;

finding, from all the pages occupied by the article, the location at which the specified content corresponding to the comment content is located on all the pages occupied by the article;

inserting the comment content to the found location; and returning the article to which the comment content is inserted to the client that sends the comment content obtaining request for display.

With reference to the first possible implementation of the third aspect, an embodiment of the present disclosure provides a second possible implementation of the third aspect, where the location at which the specified content corresponding to the comment content is located on all the pages occupied by the article includes:

a DOM node that corresponds to the specified content corresponding to the comment content and that is in a DOM tree of all the pages occupied by the article; and the finding, from all the pages occupied by the article, the location at which the specified content corresponding to the comment content is located on all the pages occupied by the article includes:

finding, from all the pages occupied by the article, the DOM node that corresponds to the specified content corresponding to the comment content and that is in the DOM tree of all the pages occupied by the article.

According to a fourth aspect, an embodiment of the present disclosure further provides a network article comment processing apparatus, running on a client, where the apparatus includes:

a location obtaining module, configured to obtain, in a process of displaying a current article, a location where user specified content in the article is located with respect to all the pages occupied by the article;

a comment content obtaining module, configured to obtain comment content posted by the user for the specified content; and an information sending module, configured to send the comment content and the location at which the specified content corresponding to the comment content is located on all the pages occupied by the article to a server.

According to a fifth aspect, the present disclosure further provides a network article comment processing apparatus, running on a client, where the apparatus includes:

an information obtaining module, configured to obtain a to-be-displayed article and comment content of the article from a server, where the comment content includes comment content corresponding to location information, and the location information defines a location at which specified content corresponding to the comment content is located with respect to all pages occupied by the article;

a comment content searching module, configured to find comment content corresponding to the location information from the comment content;

a location searching module, configured to find, from all the pages occupied by the article and according to the location information corresponding to the found comment content, a location at which specified content corresponding to the comment content is located on all the pages occupied by the article; and a comment content display module, configured to display the comment content at the found location.

According to a sixth aspect, an embodiment of the present disclosure further provides a network article comment processing apparatus, running on a server, where the apparatus includes:

an information receiving module, configured to receive comment content and a location at which specified content corresponding to the comment content is located on all pages occupied by an article, where the comment content and the location are sent by at least one client; and an information storing module, configured to store the comment content and the location at which the specified content corresponding to the comment content is located on all the pages occupied by the article.

According to a seventh aspect, an embodiment of the present disclosure further provides a user terminal device, including:

a first memory;

a first display, configured to display an article;

a first processor, configured to: obtain a location at which specified content of a user in the article displayed on the first display is located with respect to all pages occupied by the article, and comment content posted by the user for the specified content; and store the location at which the specified content is located on all the pages occupied by the article and the comment content in the first memory; and a first network communications module, configured to: in response to a sending instruction of the processor, send the comment content and the location at which the specified content corresponding to the comment content is located on all the pages occupied by the article to a server.

According to an eighth aspect, an embodiment of the present disclosure further provides another user terminal device, including:

a second memory;

a second network communications module, configured to: obtain a to-be-displayed article and comment content of the article from a server, and store the article and the comment content in the second memory, where the comment content includes comment content corresponding to location information, and the location information defines a location at which specified content corresponding to the comment content is located with respect to all pages occupied by the article;

a second processor, configured to: find comment content corresponding to the location information from the comment content; and find, from all the pages occupied by the article and according to the location information corresponding to the found comment content, a location at which specified content corresponding to the comment content is located on all the pages occupied by the article; and a second display, configured to: display the article, and display the comment content at the location found by the second processor.

According to a ninth aspect, an embodiment of the present disclosure further provides a server, including:

a third memory;

a third network communications module; and a third processor, connected to the third memory and the third network communications module, and configured to: instruct the third network communications module to receive comment content and a location at which specified content corresponding to the comment content is located on all pages occupied by an article, where the comment content and the location are sent by at least one client; and store the comment content and the location at which the specified content corresponding to the comment content is located on all the pages occupied by the article in the third memory.

According to a tenth aspect, an embodiment of the present disclosure further provides a non-transitory machine-readable storage medium storing executable code, the executable code, when executed by a processor, causing the processor to execute the method according to the present disclosure.

According to a eleventh aspect, an embodiment of the present disclosure further provides a network article comment processing apparatus. The apparatus comprises a processor and a non-transitory computer-readable storage medium storing instructions that, when executed by the processor, cause the apparatus to perform a method. The method comprising: obtaining, in a process of displaying a current article, a location where user specified content in the article is located with respect to all pages occupied by the article, obtaining comment content posted by the user for the user specified content, and sending the comment content and the location to a server.

The embodiments of the present disclosure provide the network article comment processing method and apparatus, the user terminal device, the server, and the non-transitory machine-readable storage medium, so that the comment content is posted at the location of the specified content, to replace the prior art in which comments are posted in the comment column at the bottom of the article. According to the comment processing method and apparatus in the embodiments of the present disclosure, when the user posts a comment, the comment content and the location at which the specified content corresponding to the comment content is located on all the pages occupied by the article are both recorded; and when a user views the article, the comment content is displayed at the location at which the specified content corresponding to the comment content is located on all the pages occupied by the article. In this comment processing manner, when reading the specified content, the user may simultaneously read the comment content posted for the specified content. Compared with the prior art in which the comment content is placed at the bottom of the entire article, the article and comments are relatively closely related, and the user may simultaneously read content of the article and the comment content when reading the article, thereby obviously improving reading convenience and user reading experience.

To make the objectives, features, and advantages of the present disclosure more comprehensible, preferred embodiments are described in detail below with the accompanying drawings.

BRIEF DESCRIPTION OF THE DRAWINGS

To more clearly describe the technical solutions of the embodiments of the present disclosure, the following briefly describes the accompanying drawings required in the embodiments. It should be understood that the following accompanying drawings show only some embodiments of the present disclosure, and therefore shall not be considered as limitation on the scope, and a person of ordinary skill in the art may further obtain other related accompanying drawings according to the accompanying drawings without creative work.

FIG. 12 is a schematic interface diagram of a comment processing method according to the fifth embodiment of the present disclosure;

FIG. 13 is a schematic flowchart of a comment processing method according to a sixth embodiment of the present disclosure;

DETAILED DESCRIPTION

The following describes preferred implementations of the present disclosure with reference to the accompanying drawings in further detail. Although the accompanying drawings show preferred implementations of the present disclosure, it should be understood that the present disclosure may be implemented in various forms and shall not be limited by the implementations described herein. Rather, the implementations provided aim to make the present disclosure more comprehensible and complete, and enable the scope of the present disclosure to be completely conveyed to a person skilled in the art.

Figure 1:
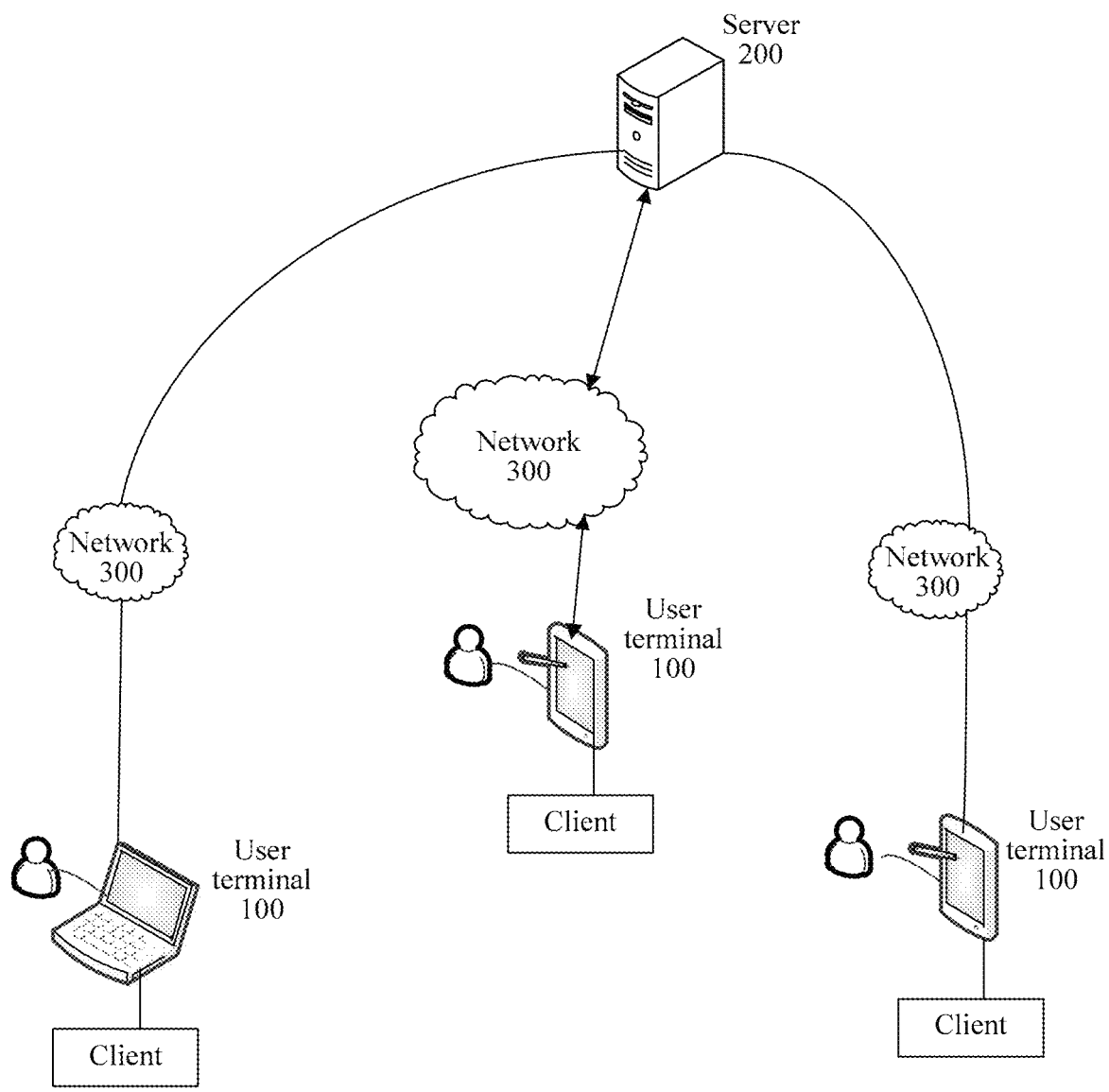
FIG. 1 is a schematic diagram of an application environment of a network article comment processing method and apparatus according to an embodiment of the present disclosure.

The method and the network article comment processing apparatus provided in the embodiments of the present disclosure are applicable to an application environment shown in FIG. 1. As shown in FIG. 1, a user terminal 100 and a server 200 are located on a wireless network or a wired network 300, and the user terminal 100 exchanges data with the server 200 by using the wireless network or the wired network 300.

In this embodiment of the present disclosure, the user terminal 100 is preferably a mobile terminal device, for example, may include a smartphone, a tablet computer, an ebook reader, a moving picture experts group audio layer III (MP3) player, a moving picture experts group audio layer IV (MP4) player, a laptop portable computer, an in-vehicle computer, or a wearable mobile terminal.

Figure 2:
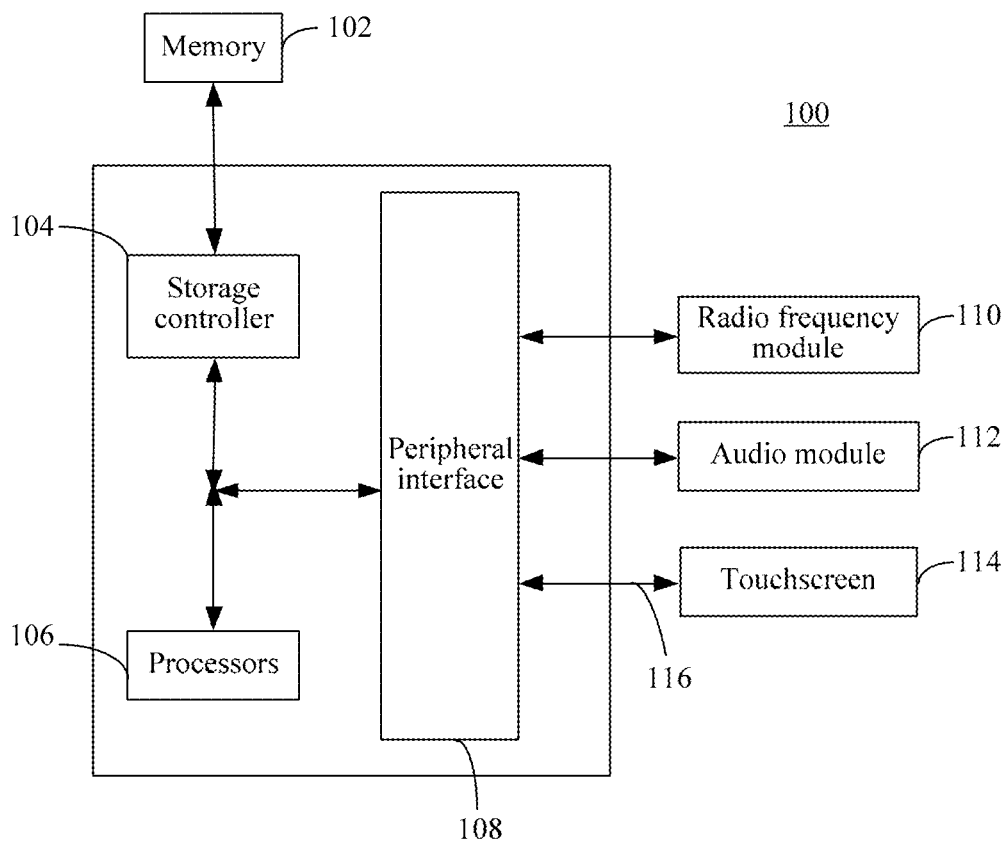
FIG. 2 is a structural block diagram of a user terminal applicable to an embodiment of the present disclosure.

FIG. 2 is a structural block diagram of a user terminal applicable to an embodiment of the present disclosure. As shown in FIG. 2, the user terminal 100 includes a memory 102, a storage controller 104, one or more (only one is shown in the figure) processors 106, a peripheral interface 108, a radio frequency module 110, an audio module 112, a touchscreen 114, and the like. These components communicate with each other by using one or more communications buses/signal lines 116.

The memory 102 may be configured to store a software program and a module, for example, a program instruction/module corresponding to the network article comment processing method and apparatus in the embodiments of the present disclosure. The processor 106 runs the software program and the module stored in the memory 102, to perform various functional application and data processing, for example, the comment processing method provided in the embodiments of the present disclosure.

The memory 102 may include a high-speed random access memory, and may further include a non-volatile memory, for example, one or more magnetic storage apparatuses, a flash memory, or another non-volatile solid-state memory. The processor 106 and another possible component may access the memory 102 under control of the storage controller 104.

The peripheral interface 108 couples various input/output apparatuses to the processor 106 and the memory 102. In some embodiments, the peripheral interface 108, the processor 106, and the storage controller 104 may be implemented in a single chip. In some other embodiments, the peripheral interface 108, the processor 106, and the storage controller 104 may be implemented by independent chips.

The radio frequency module 110 is configured to receive and send an electromagnetic wave, and implement conversion between an electromagnetic wave and an electrical signal, to communicate with a communications network or another device.

The audio module 112 provides an audio interface to a user, and may include one or more microphones, and one or more speakers and audio circuits.

The touchscreen 114 provides both output and input interfaces between the user terminal 100 and a user. Specifically, the touchscreen 114 displays article outputs to a user, and content of the article outputs may include text, a graph, and any combination thereof.

It may be understood that the structure shown in FIG. 2 is only exemplary, and the user terminal 100 may further include more or less components than those shown in FIG. 2, or may have a configuration different from that shown in FIG. 2. The various components shown in FIG. 2 may be implemented by using hardware, software, or a combination thereof.

Figure 3:
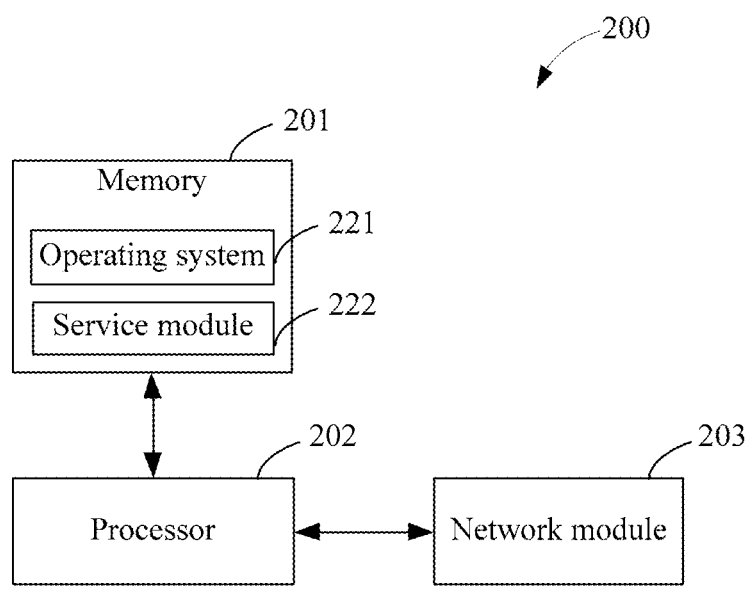
FIG. 3 is a structural block diagram of a server applicable to an embodiment of the present disclosure.

FIG. 3 is a structural block diagram of a server applicable to an embodiment of the present disclosure. As shown in FIG. 3, the server 200 includes: a memory 201, a processor 202, and a network module 203.

The memory 201 may be configured to store a software program and a module, for example, a program instruction/module corresponding to the network article comment processing method and apparatus in the embodiments of the present disclosure. The processor 202 runs the software program and the module stored in the memory 201, to perform various functional applications and data processing, for example, perform the network article comment processing method in the embodiments of the present disclosure. The memory 201 may include a high-speed random access memory, and may further include a non-volatile memory, for example, one or more magnetic storage apparatuses, a flash memory, or another non-volatile solid-state memory. Further, the software program and the module in the memory 201 may further include an operating system 221 and a service module 222. The operating system 221 may be, for example, LINUX, UNIX, or WINDOWS, and may include various software components and/or drives used to manage system tasks (for example, memory management, storage device control, and power supply management), and may communicate with various hardware or software components, to provide a running environment of another software component. The service module 222 runs based on the operating system 221, listens for a request from a network by using a network service of the operating system 221, completes corresponding data processing according to the request, and returns a processing result to the client. That is, the service module 222 is configured to provide a network service to a client.

The network module 203 is configured to receive and send a network signal. The network signal may include a wireless signal or a wired signal.

It may be understood that the structure shown in FIG. 3 is only exemplary, and the server 200 may further include more or less components than those shown in FIG. 3, or may have a configuration different from that shown in FIG. 3. The various components shown in FIG. 3 may be implemented by using hardware, software, or a combination thereof. In addition, the server in the embodiments of the present disclosure may further include multiple servers having different functions.

In the embodiments of the present disclosure, the user terminal 100 is installed with a client, and the client may be a client or may be third-party application software. The client corresponds to a server end, and provides a service to a user, for example, an article display service, to display a local article and a network article.

The embodiments of the present disclosure are mainly based on a mobile application scenario, and provide a new comment processing manner for a network article, to display comment content at a location at which specified content corresponding to the comment content is located with respect to all pages occupied by an article, instead of displaying all comment content at the bottom of the entire article in the prior art. In some embodiments, the pages occupied by an article may refer to web pages. In some embodiments, the pages occupied by an article may be viewable by a mobile terminal device, for example, a tablet computer, an ebook reader, a moving picture experts group audio layer III (MP3) player, a moving picture experts group audio layer IV (MP4) player, a laptop portable computer, an in-vehicle computer, or a wearable mobile terminal.

Because most comment content is posted for content of a paragraph in the article, the comment content is displayed at the location at which the specified content corresponding to the comment content is located with respect to all the pages occupied by the article, so that when a user reads the article, the user can simultaneously read, while reading the specified content, the comment content posted for the specified content, and can better combine the content of the article and the comment content in reading, thereby improving user reading experience.

In the embodiments of the present disclosure, comment processing may be approximately divided into three modes. In a first mode, the specified content is selected by using an operation gesture to provide a comment, that is, a user directly selects, by using a finger or a stylus, the specified content to provide a comment on a page displayed on the display screen of the touchscreen 114. In a second mode, the specified content is selected to provide a comment by using a preset location of a comment column, that is, the comment column is displayed at a preset location of a current page, and content that the comment column points to when the user posts the comment content in the comment column and that is in the article is used as the specified content. In a third mode, multiple comment columns are provided, the multiple comment columns are displayed at various locations of all the pages occupied by the article, and according to correspondences between the comment columns and the various locations of all the pages occupied by the article, a comment is posted in the comment column corresponding to the location of the specified content.

It should be noted that in the embodiments of the present disclosure, one of the foregoing three modes may be randomly selected and used, and a mode specifically used may be autonomously set or selected by a user, or may be preset in a system.

The following clearly and completely describes the technical solutions in the embodiments of the present disclosure with reference to the accompanying drawings in the embodiments of the present disclosure. Apparently, the described embodiments are only some embodiments instead of all embodiments of the present disclosure. Generally, components in the embodiments of the present disclosure described and shown herein in the accompanying drawings may be arranged and designed in various different configurations. Therefore, the following detailed descriptions of the embodiments of the present disclosure provided in the accompanying drawings are not intended to limit the claimed scope of the present disclosure, and only indicate optional embodiments of the present disclosure. All other embodiments obtained by a person skilled in the art based on the embodiments of the present disclosure without any creative work fall within the protection scope of the present disclosure.

First Embodiment

Figure 4:
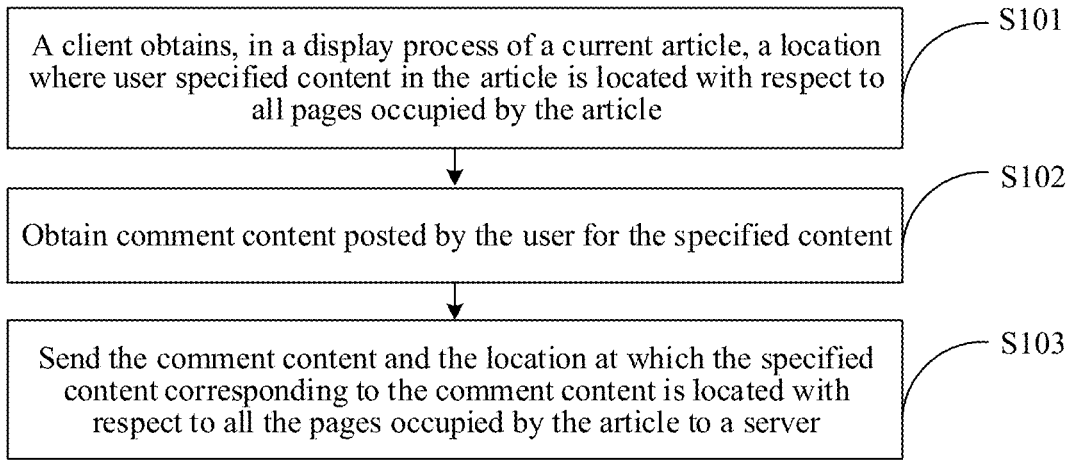
FIG. 4 is a schematic flowchart of a comment processing method according to a first embodiment of the present disclosure.

FIG. 4 shows a network article comment processing method according to a first embodiment of the present disclosure. Referring to FIG. 4, this embodiment describes a processing procedure of a client in a user terminal.

Step S101: A client obtains, in a process of displaying a current article, a location where user specified content in the article is located with respect to all the pages occupied by the article.

Before the user displays the article on the client, or in a process of displaying the article, the user may select whether to enter a specified comment mode. A simple manner of entering a specified comment mode may be defined in a system. For example, it may be defined that a specified comment mode is entered when the user selects a selection box "enter a specified comment mode" on a client interaction interface, it may be defined that a specified comment mode is entered when the user clicks a button "specified comment mode" on a client interaction interface, or a specified comment mode is entered when the user uses a predefined gesture such as a gesture "V", or the like. Certainly, it may also be set on the client that a specified comment mode is entered when the article is displayed. The foregoing describes only specific examples of entering a specified comment mode. It may be understood that specific implementations of the present disclosure are not limited thereto.

After entering a specified comment mode, the user may perform a commenting operation on a page displayed on the display screen. The client monitors the commenting operation performed by the user on the page displayed on the display screen, and the commenting operation on the page displayed on the display screen includes that the user selects the specified content and posts the comment content for the specified content on the page displayed on the display screen.

In this embodiment of the present disclosure, the specified content may be selected in multiple manners, and three manners thereof are listed in this embodiment of the present disclosure. For example, in a first comment processing mode, the user directly selects the specified content by using the operation gesture on the page displayed on the display screen. For another example, in a second comment processing mode, the article is flipped, and content that the comment column points to and that is in the article is used as the specified content. For another example, in a third comment processing mode, the article is flipped, and text at a location corresponding to the comment column in which the comment content is posted is used as the specified content.

The specified content may include text, pictures, and the like in the article.

Correspondingly, the location at which the specified content is located on all the pages occupied by the article may be determined in multiple manners. For example, in a first comment processing mode, the location at which the specified content is located on all the pages occupied by the article may be determined by using a location at which the operation gesture for selecting the specified content is located on the current page of the article and a location of the current page on all the pages occupied by the article. For another example, in a second and a third comment modes, the location at which the specified content is located on all the pages occupied by the article may be determined by determining a location of the comment column in which comments are posted.

Step S102: Obtain comment content posted by the user for the specified content.

The user posts the comment content in multiple manners, for example, the user comments by entering text content on a keyboard, comments by entering text content by using a speech, comments by selecting a preset expression or a preset picture, or the like.

Step S103: Send the comment content and the location at which the specified content corresponding to the comment content is located on all the pages occupied by the article to a server.

In the network article comment processing method provided in the first embodiment, the user may comment on the specified content of the article, and does not need to flip to the bottom of the entire article for commenting, thereby improving convenience and timeliness of commenting.

The three comment processing modes are respectively used as an example in the second to the fourth embodiments in the following, to describe a processing procedure on the client in detail. The first comment processing mode is used as an example in the second embodiment, the second comment processing mode is used as an example in the third embodiment, and the third comment processing mode is used as an example in the fourth embodiment.

Second Embodiment

Figure 5:
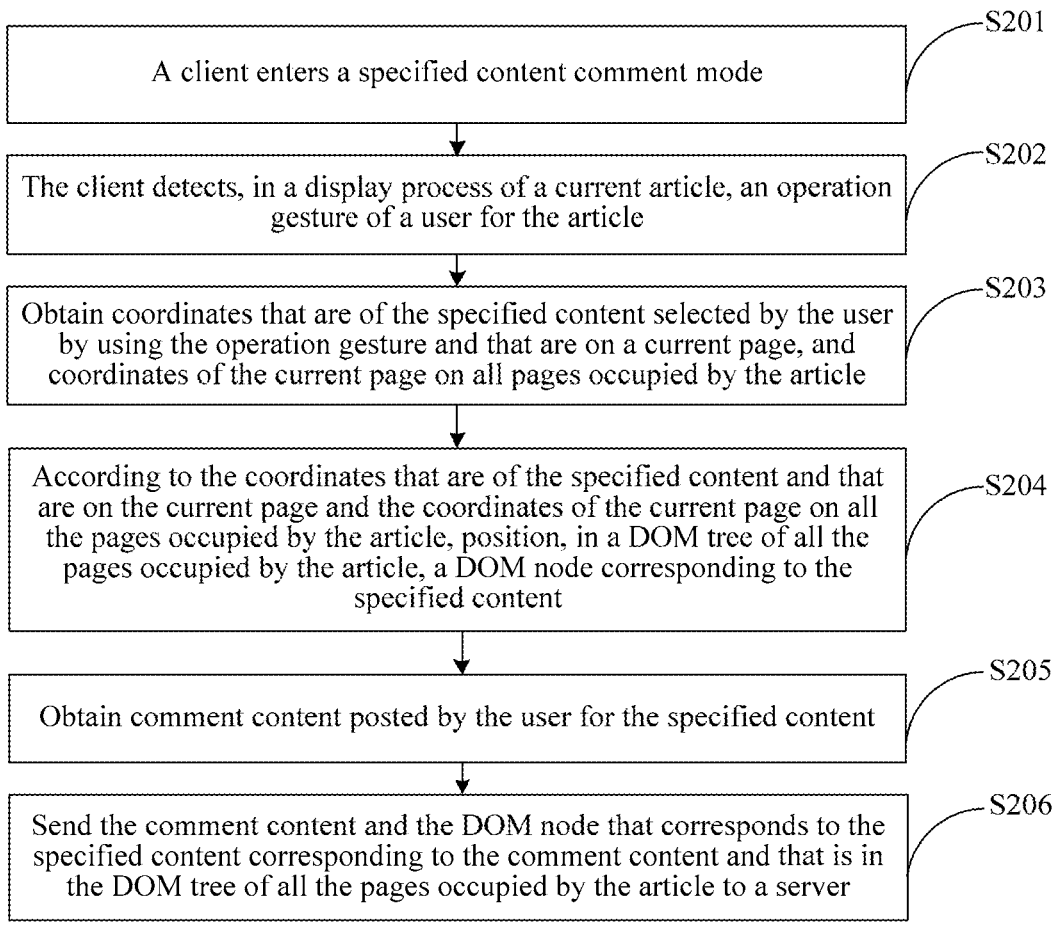
FIG. 5 is a schematic flowchart of a comment processing method according to a second embodiment of the present disclosure.
Figure 6:
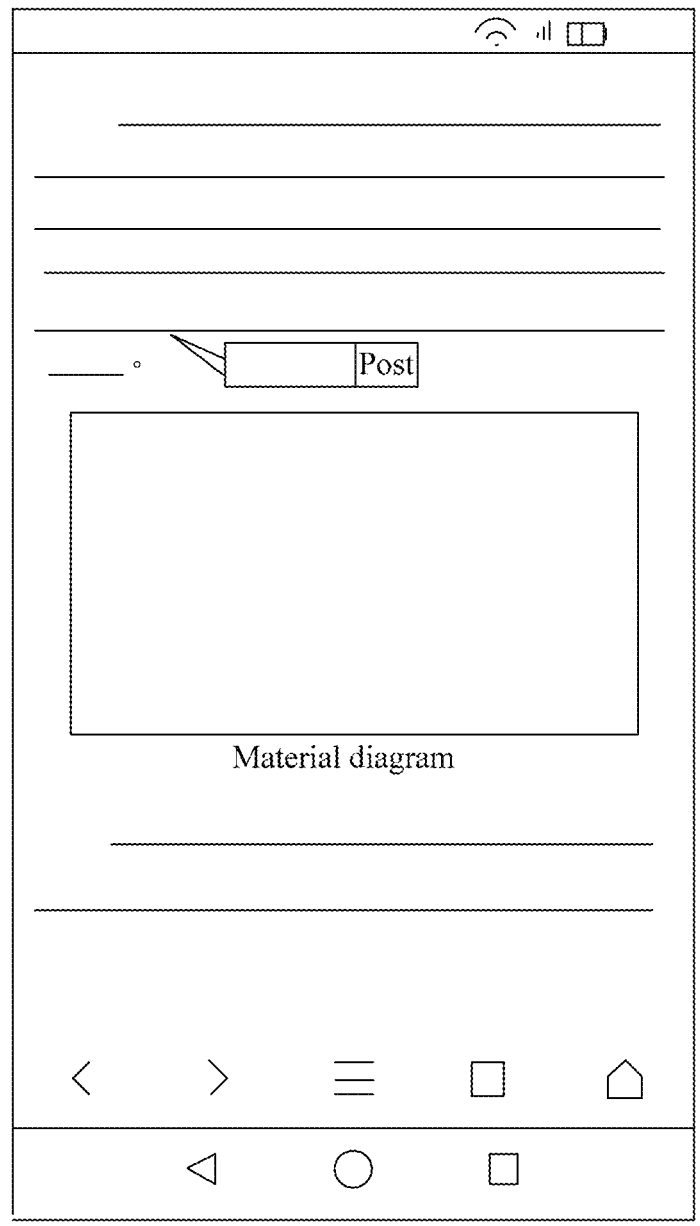
FIG. 6 is a schematic diagram of an interaction interface according to the second embodiment of the present disclosure.

FIG. 5 is a flowchart of a network article comment processing method according to a second embodiment of the present disclosure. FIG. 6 is a schematic diagram of an interaction interface according to the second embodiment of the present disclosure. Referring to both FIG. 5 and FIG. 6, the first comment processing mode is used as an example in this embodiment, to describe a processing procedure on a client of a user terminal.

Step S201: A client enters a specified content comment mode.

For details about how to enter a specified content comment mode, refer to the related description in the first embodiment, and details are not described herein again.

Step S202: The client detects, in a process of displaying a current article, an operation gesture of a user for the article, where the operation gesture is used to select specified content.

In this step, the operation gesture may include long press, multiple clicks, a particular slide track, and the like. The client monitors an action such as long press, multiple clicks, or a particular slide track performed by the user on the article, and content that is selected by means of long press, multiple clicks, or a particular slide track and that is in the article is used as the specified content.

Step S203: Obtain coordinates of the specified content on a current page that is selected by the user by using the operation gesture, and coordinates of the current page with respect to all pages occupied by the article.

In this embodiment, the current page is a page displayed on the display screen of the user terminal, for example, the display area of the display screen is a×b, and in this case, content displayed in the display area a×b is content on the current page.

The coordinates that are of the specified content on the current page that is selected by using the operation gesture are preferably coordinates of the specified content of the current page relative to a fixed location of the display screen, for example, coordinates of a contact location of the operation gesture and the display screen relative to the upper left corner of the display screen.

Step S204: According to the coordinates of the specified content and on the current page and the coordinates of the current page on all the pages occupied by the article, position, in a DOM tree of all the pages occupied by the article, a DOM node corresponding to the specified content.

In this step, the DOM tree of all the pages occupied by the article may be flexibly established according to a requirement. For example, a DOM node is established for content of each paragraph, content of each chapter, and the like of the article, and all DOM nodes jointly form the DOM tree of all the pages occupied by the article. A DOM node is established for content of each paragraph, content of each chapter, and the like of the article, and the comment content is displayed at a neighboring location of each paragraph or each chapter of the article. This can ensure reading coherence of the article. In this setting, if the specified content selected by the user by using the operation gesture is a sentence in a paragraph, the client searches the DOM tree for an ID of a DOM node to which the sentence belongs, and if the node to which the sentence belongs has no ID attribute, a parent node is searched for recursively upwards, until a node having an ID is obtained by recursion. For example, if a DOM node is established for content of each paragraph of the article, and the specified content selected by using the operation gesture is a sentence in a paragraph A, a node that has an ID and that is obtained for the sentence by recursion is a DOM node corresponding to the paragraph A.

To make a manner of determining the DOM node corresponding to the specified content clearer, in this embodiment, an example in which a DOM node corresponding to specified content N is determined in an article A is used for description. Coordinates (x1, y1) of a location at which a finger or a stylus of the user is in contact with the display screen when the user selects the specified content N by using the operation gesture such as long press, multiple clicks, or the like relative to the upper left corner of the display screen are obtained. Coordinates of the current page displayed on the display screen on all the pages occupied by the article are obtained. For example, it is obtained by positioning that the current page is located in a $(z(n))^{th}$ row to a $(z(n+m))^{th}$ row of all the pages occupied by the article, and the $(z(n))^{th}$ row to the $(z(n+m))^{th}$ row of all the pages occupied by the article are searched for a paragraph in which content at the location of the coordinates (x1, y1) is located on all the pages occupied by the article, and a DOM node that corresponds to the paragraph and that is in the DOM tree of all the pages occupied by the article is a DOM node corresponding to the specified content.

Step S205: Obtain comment content posted by the user for the specified content.

For details about how to obtain the comment content posted by the user, refer to the related description in the first embodiment, and details are not described herein again.

In this embodiment, preferably, when the user selects the specified content by using the operation gesture, the client displays the comment column at a neighboring location of the specified content. As shown in FIG. 6, the user posts the comment content in the comment column, and after the user finishes posting the comment content, the client obtains the comment content posted by the user, hides the comment column, and displays the comment column again only when the user selects the specified content again by using the operation gesture.

Step S206: Send the comment content and the DOM node that corresponds to the specified content corresponding to the comment content and that is in the DOM tree of all the pages occupied by the article to a server.

In the network article comment processing method provided in this embodiment of the present disclosure, the user may flexibly select, by using the operation gesture, the specified content from content displayed on the current page. Based on this method, when the user does not need to comment on the specified content, the display screen may not display the comment column, and when the user needs to comment on the specified content, the display screen displays the comment column, so that the user enters the comment content, to ensure conciseness of the current page and flexibility of a user operation when the user reads the article.

Third Embodiment

Figure 7:
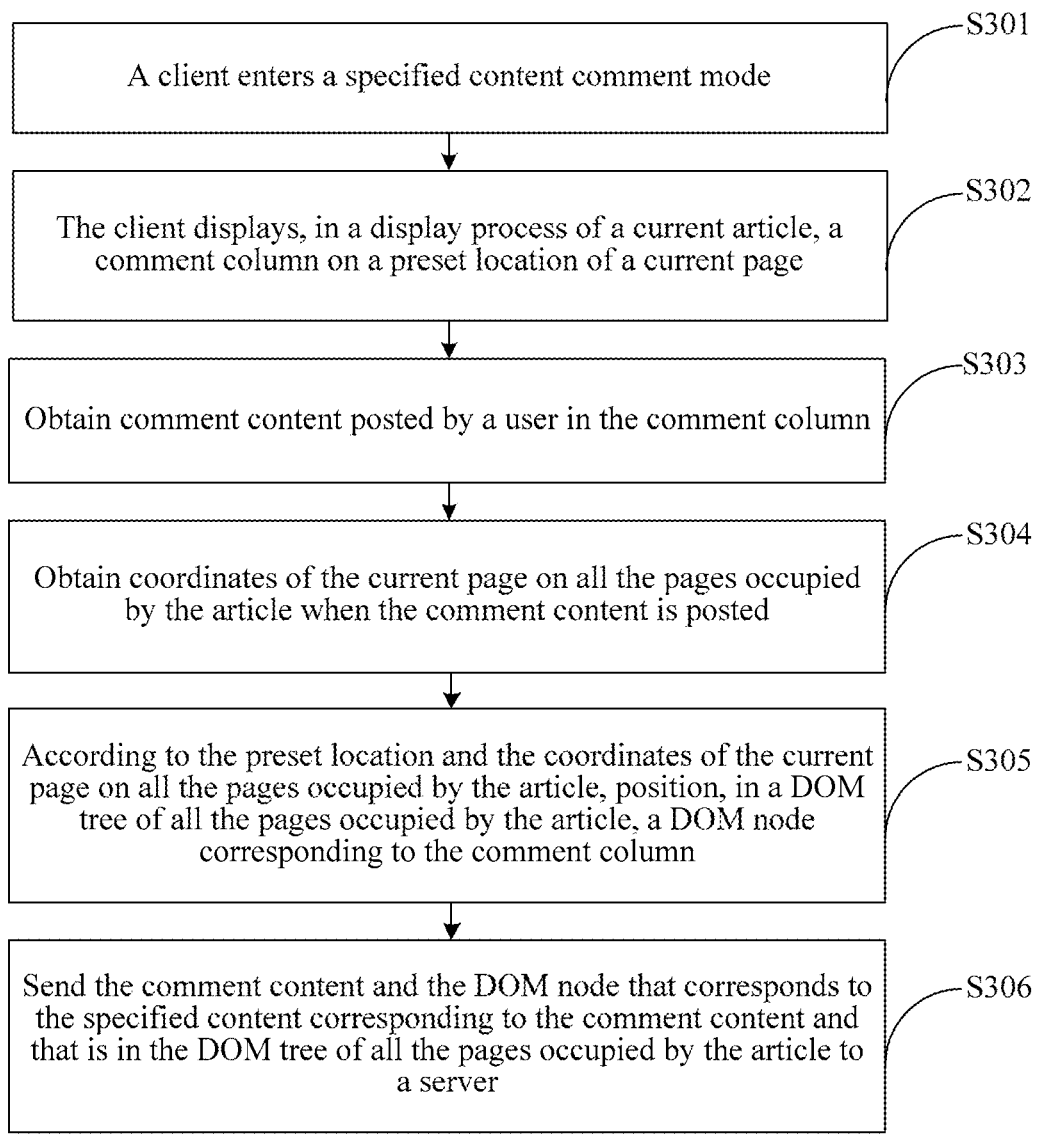
FIG. 7 is a schematic flowchart of a comment processing method according to a third embodiment of the present disclosure.
Figure 8:
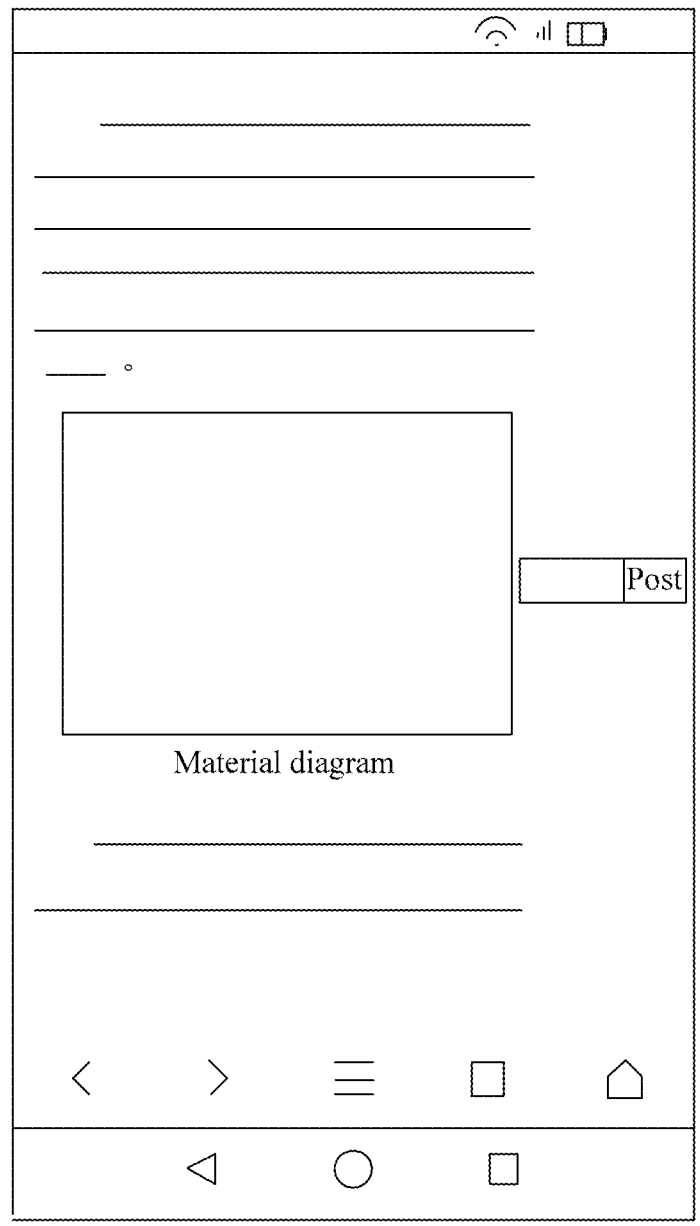
FIG. 8 is a schematic diagram of an interaction interface according to the third embodiment of the present disclosure.

FIG. 7 is a flowchart of a network article comment processing method according to a third embodiment of the present disclosure. FIG. 8 is a schematic diagram of an interaction interface according to the third embodiment of the present disclosure. Referring to both FIG. 7 and FIG. 8, the second comment processing mode is used as an example in this embodiment, to describe a processing procedure on the client of the user terminal.

Step S301: A client enters a specified content comment mode.

For details about how to enter a specified content comment mode, refer to the related description in the first embodiment, and details are not described herein again.

Step S302: The client displays, in a process of displaying a current article, a comment column on a preset location of a current page.

For definition of the current page, refer to the related description in the second embodiment, and details are not described herein again. Preferably, the preset location is a fixed location of the current page (the display screen), for example, may be the left side, the right side, a particular location of the lower side, or the like of the current page. For example, after the client enters a specified content comment mode, the comment column is always displayed at the middle location of the right side of the current page. If coordinates of the middle location of the right side of the current page relative to the upper left corner of the display screen are (x1, y1), coordinates of the preset location of the comment column are always (x1, y1).

The specified content is content that the comment column points to and that is in the article when the comment content is published, for example, content that the comment column points to is content that is in the article and that is located at a same horizontal location as that of the comment column. When the comment content is posted in the comment column, content at the middle location of the current page is the specified content. For example, if a user posts the comment content in the comment column in FIG. 8, a material diagram on the current page is the specified content.

Step S303: Obtain the comment content posted by a user in the comment column.

For details about how to post the comment content, refer to the related description in the first embodiment, and details are not described herein again.

Step S304: Obtain coordinates of the current page with respect to all pages occupied by the article when the comment content is posted.

For details about how to obtain the coordinates of the current page on all the pages occupied by the article, refer to the related descriptions of the second embodiment, and details are not described herein again.

Step S305: According to the preset location and the coordinates of the current page on all the pages occupied by the article, position, in a DOM tree of all the pages occupied by the article, a DOM node corresponding to the comment column.

In this embodiment, for establishment of the DOM tree of all the pages occupied by the article, refer to the related description of the second embodiment, and details are not described herein again.

To make a manner of determining the DOM node corresponding to the specified content clearer in this embodiment, in this embodiment, an example in which specified content N is determined in the article A, and content pointed to by the comment column is content in the article located at a same horizontal location as that of the comment column is used for description.

When the user posts comments in the comment column, content on the current page located at a same horizontal location as that of the comment column is the specified content. The preset location of the comment column on the current page is (x1, y1). The coordinates of the current page displayed on the display screen on all the pages occupied by the article are obtained. For example, it is obtained by positioning that the current page is located in a $(z(n))^{th}$ row to a $(z(n+m))^{th}$ row of all the pages occupied by the article. The $(z(n))^{th}$ row to the $(z(n+m))^{th}$ row of all the pages occupied by the article are searched for a paragraph of content at the location of the coordinates (x1, y1) on all the pages occupied by the article. A DOM node that corresponds to the paragraph and that is in the DOM tree of all the pages occupied by the article is a DOM node corresponding to the comment column. The location at which the specified content is located on all the pages occupied by the article is the DOM node that corresponds to the comment column and that is in the DOM tree of all the pages occupied by the article.

Step S306: Send the comment content and the DOM node that corresponds to the specified content corresponding to the comment content and that is in the DOM tree of all the pages occupied by the article to a server.

In the network article comment processing method provided in this embodiment of the present disclosure, when the specified content needs to be moved to the location pointed to by the comment column, the user may post the comment content in the comment column displayed at the preset location of the current page. When the comment content is posted, the client may position, in the DOM tree of all the pages occupied by the article and according to the coordinates of the preset location and the coordinates of the current page on all the pages occupied by the article, the DOM node corresponding to the comment column. The user does not need to perform an operation of selecting the specified content by using the operation gesture or the like, which is relatively convenient in usage.

Fourth Embodiment

Figure 9:
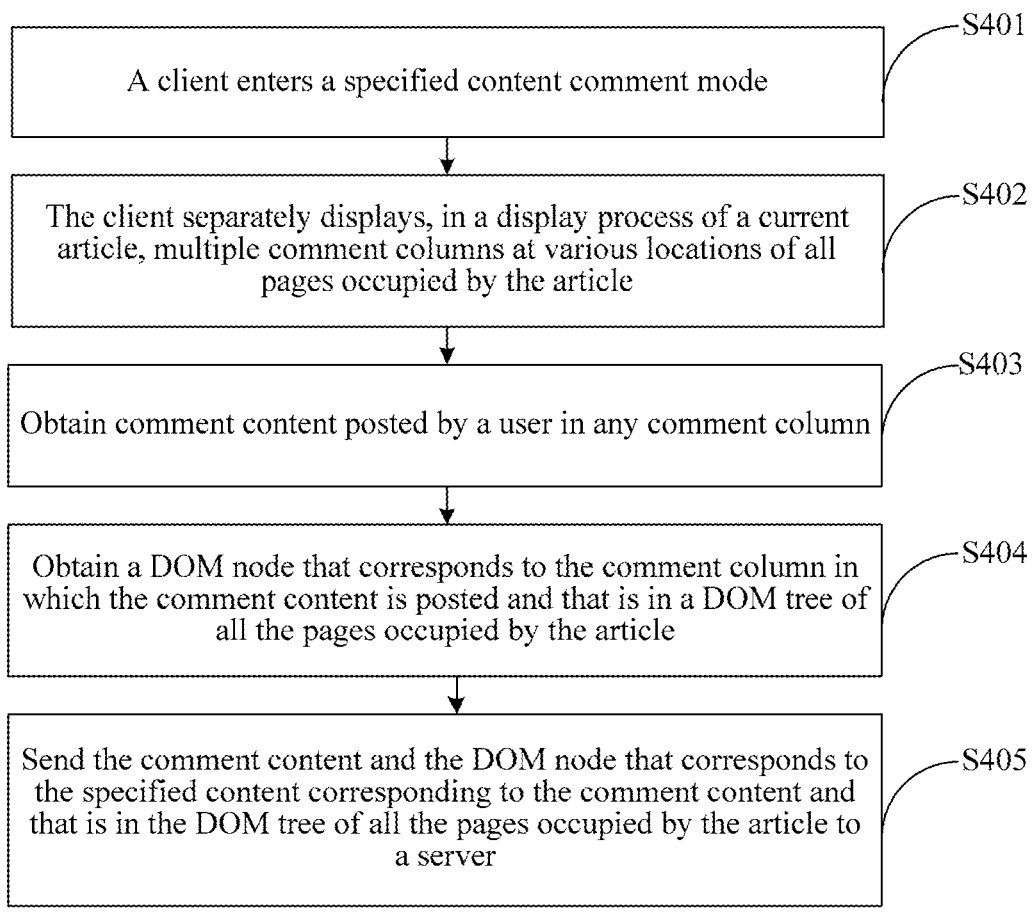
FIG. 9 is a schematic flowchart of a comment processing method according to a fourth embodiment of the present disclosure.
Figure 10:
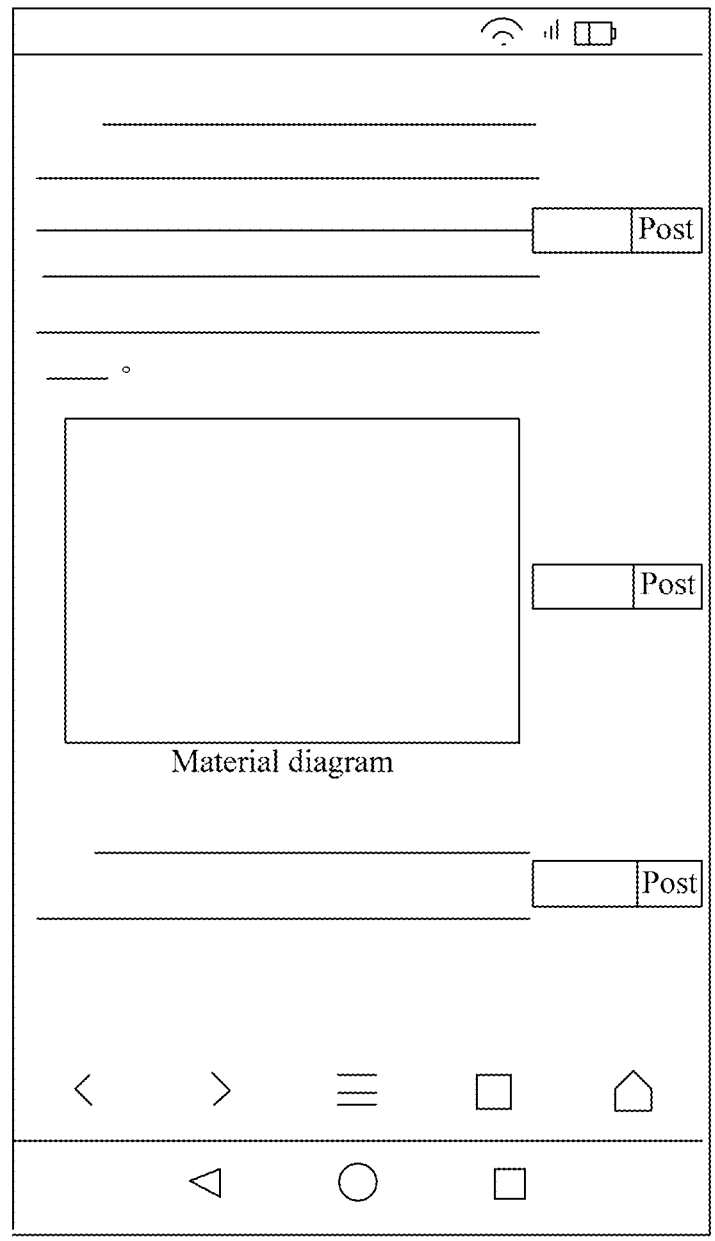
FIG. 10 is a schematic diagram of an interaction interface according to the fourth embodiment of the present disclosure.

FIG. 9 is a flowchart of a network article comment processing method according to a fourth embodiment of the present disclosure. FIG. 10 is a schematic diagram of an interaction interface according to the fourth embodiment of the present disclosure. Referring to both FIG. 9 and FIG. 10, the third comment processing mode is used as an example in this embodiment, to describe a processing procedure on the client of the user terminal.

Step S401: A client enters a specified content comment mode.

For details about how to enter a specified content comment mode, refer to the related description in the first embodiment, and details are not described herein again.

Step S402: The client separately displays, in a process of displaying a current article, multiple comment columns at various locations of all pages occupied by the article, where the multiple comment columns are in a one-to-one correspondence with various DOM nodes in a DOM tree of all the pages occupied by the article.

In this embodiment, for establishment of the DOM tree of all the pages occupied by the article, refer to the related description of the second embodiment, and details are not described herein again.

The multiple comment columns may be displayed at a location such as the left side or the right side of all the pages occupied by the article, and are located on various DOM nodes of the DOM tree. For example, each paragraph of the article corresponds to a DOM node, and in this case, a comment column is displayed at a location such as the left side or the right side of each paragraph.

Step S403: Obtain comment content posted by a user in any comment column, where the specified content is content in the article on a DOM node corresponding to a comment column in which the comment content is posted.

For details about how to post the comment content, refer to the related description in the first embodiment, and details are not described herein again.

Step S404: Obtain the DOM node that corresponds to the comment column in which the comment content is posted and that is in the DOM tree of all the pages occupied by the article, and use the obtained DOM node as the location at which the specified content is located on all the pages occupied by the article.

Step S405: Send the comment content and the DOM node that corresponds to the specified content corresponding to the comment content and that is in the DOM tree of all the pages occupied by the article to a server.

Because a correspondence between a comment column and a DOM node of the DOM tree is determinate, content on the DOM node that corresponds to the comment column in which the comment content is posted and that is in the DOM tree of all the pages occupied by the article is the specified content, and a location of the specified content is the DOM node. For example, the entire article has three paragraphs, and the DOM tree of all the pages occupied by the article has three DOM nodes. After the client enters a specified content comment mode, the comment column is displayed on the left side or the right side of each paragraph, and the entire article has three comment columns. It is set that content on a DOM node A of the DOM tree is a paragraph A, and the DOM node A corresponds to a comment column A. The three comment columns are always displayed in the three paragraphs of the entire article and move with the article. In this case, when the user posts the comment content in the comment column A, the client may quickly learn, according to the correspondence, that the DOM node A corresponding to the comment column A is a location of the paragraph A of the specified content on all the pages occupied by the article.

During implementation, the comment column in the second embodiment to the fourth embodiment may be transparent, the transparent comment column may cover a page displayed by the display screen, and a transparency degree of the comment column may be preset as long as reading of content of the article by the user is not affected after the comment column is displayed. When the comment column is transparent, in FIG. 8 and FIG. 10, content of the article may be displayed on the entire display screen.

In the first embodiment to the fourth embodiment, the client sends the comment content and the location at which the specified content corresponding to the comment content is located with respect to all the pages occupied by the article to the server in multiple manners. For example, the comment content and the location at which the specified content corresponding to the comment content is located with respect to all the pages occupied by the article may be associated, and then sent to the server. In this embodiment of the present disclosure, preferably, the client sends the comment content and the location at which the specified content corresponding to the comment content is located with respect to all the pages occupied by the article to the server by using a preset format. The preset format includes: a keyword identifier, a location identifier, and comment content. The location identifier defines the location at which the specified content corresponding to the comment content is located with respect to all the pages occupied by the article, and the keyword identifier defines that the comment content is comment content having a location identifier.

Content of the preset format may have multiple forms. During implementation, representation forms of the keyword identifier and the location identifier may be flexibly set. For example, when the specified content is "what name and what company?", the keyword identifier is "uc_super-_comment", and the location identifier is "p" and "2", it represents that on a second DOM node of the DOM tree of all the pages occupied by the article, a representation form of the preset format may be "uc_super_comment: {"p", "2", "what name and what company?"}".

In the network article comment processing method provided in this embodiment of the present disclosure, the user may post the comment content in the comment column corresponding to the DOM node on which the specified content is located. When the user posts the comment content in the comment column, the client may quickly learn, according to the correspondence, that the DOM node corresponding to the comment column is the location at which the specified content is located on all the pages occupied by the article. Therefore, positioning is quick and accurate and usage is relatively convenient.

In the foregoing embodiments, a method for the client to obtain the comment content and the location at which the specified content corresponding to the comment content is located with respect to all the pages occupied by the article is mainly described. How a client displays an article in a specified content comment mode is mainly described below in the fifth embodiment.

Fifth Embodiment

Figure 11:
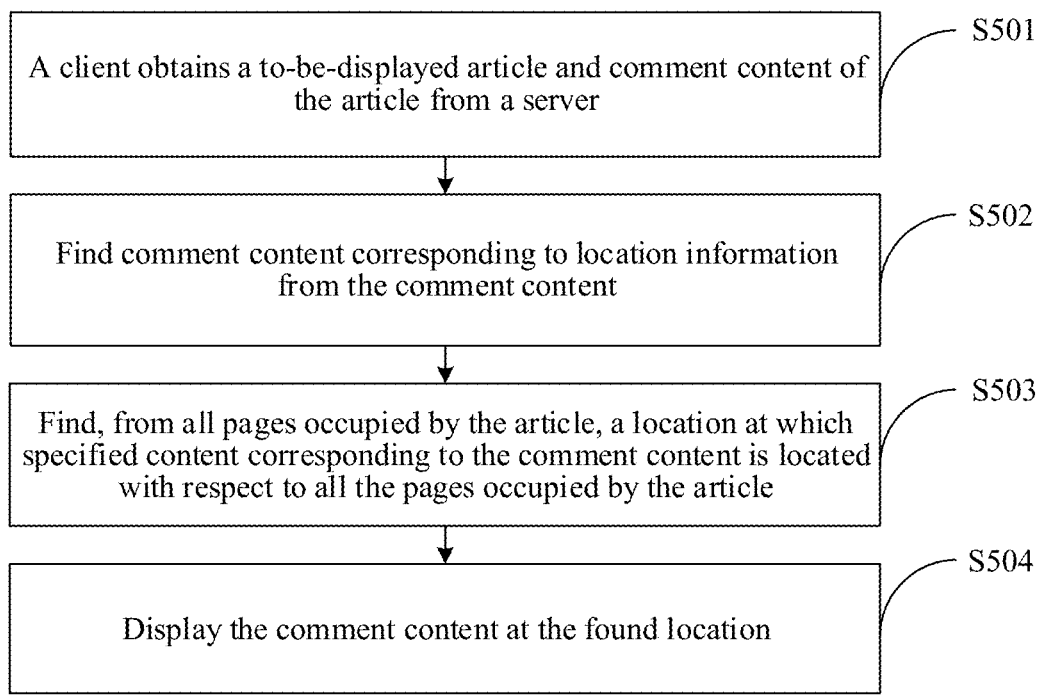
FIG. 11 is a schematic flowchart of a comment processing method according to a fifth embodiment of the present disclosure.

FIG. 11 is a flowchart of a network article comment processing method according to a fifth embodiment of the present disclosure. Referring to FIG. 11, a processing procedure of a client of a user terminal is described in this embodiment. A server interacting with the client in this embodiment stores a to-be-displayed article and article comment content uploaded by the client or another client. The comment content includes comment content corresponding to location information, and the location information defines a location at which specified content corresponding to comment content is located with respect to all pages occupied by the article.

Step S501: A client obtains a to-be-displayed article and comment content of the article from a server, where the comment content includes comment content corresponding to location information, and the location information defines a location at which specified content corresponding to the comment content is located with respect to all pages occupied by the article.

The location at which the specified content corresponding to the comment content is located with respect to all the pages occupied by the article is preferably a DOM node that corresponds to the specified content corresponding to the comment content and that is in a DOM tree of all the pages occupied by the article.

For establishing the DOM tree and determining the DOM node, refer to the content in the second embodiment to the fourth embodiment, and details are not described herein again.

To ensure that the to-be-displayed article and the article comment content obtained by the client from the server are content that the user wants to view, when the client enters a specified content comment mode, preferably, the client sends article index information of the to-be-displayed article to the server, so that after the server receives a comment content obtaining request sent by the client, the server searches a database according to the index information and returns the to-be-displayed article and the article comment content corresponding to the index information of the to-be-displayed article.

Step S502: Find comment content corresponding to the location information from the comment content.

To quickly identify the comment content corresponding to the location information, preferably, the comment content corresponding to the location information includes: a keyword identifier, a location identifier, and comment content, the location identifier defines the location at which the specified content corresponding to the comment content is located with respect to all the pages occupied by the article, and the keyword identifier defines that the comment content is comment content having a location identifier.

In this step, the client may search comment content for comment content including a location identifier according to a keyword identifier included in the comment content corresponding to the location information.

Step S503: Find, from all the pages occupied by the article and according to the location information corresponding to the found comment content, a location at which specified content corresponding to the comment content is located with respect to all the pages occupied by the article.

The location at which the specified content corresponding to the comment content is located with respect to all the pages occupied by the article is preferably the DOM node that corresponds to the specified content corresponding to the comment content and that is in the DOM tree of all the pages occupied by the article. On this basis, correspondingly, according to the location information corresponding to the found comment content, all the pages occupied by the article are preferably searched for the DOM node that corresponds to the specified content corresponding to the comment content and that is in the DOM tree of all the pages occupied by the article.

Step S504: Display the comment content at the found location.

In the foregoing description, the location information defines the DOM node that corresponds to the specified content corresponding to the comment content and that is in the DOM tree of all the pages occupied by the article. When comments are displayed, the DOM node may be found from the DOM tree of all the pages occupied by the article, and the comment content may be displayed on the DOM node.

The comment content is displayed at the found location in multiple manners. In this embodiment, preferably, a new node is inserted to a neighboring location of the found DOM node; and the comment content is inserted to the new node for display.

The insertion of a new node may include: inserting the new node after the found DOM node; inserting a brother node before the found DOM node as the new node; and inserting a subnode to the found DOM node as the new node.

Corresponding to the fourth embodiment, if the comment content corresponding to the location information is in the following form: "uc_super_comment: {"p", "2", "what name and what company?"}", and a start location of the comment content successfully matches a field of uc_super_comment, the comment content is identified as comments corresponding to the location information, and a second DOM node of the DOM tree occupied by the entire article is a DOM node that corresponds to the specified content "what name and what company?" and that is in the DOM tree of all the pages occupied by the article.

In consideration of an actual requirement, during implementation, the comment content further includes comment content corresponding to no location information. While displaying, at the location at which the specified content corresponding to the comment content is located with respect to all the pages occupied by the article, the comment content that corresponds to location information and whose corresponding location indicated by the location information is found from all the pages occupied by the article, preferably, the client further displays, at the bottom of all the pages occupied by the article, comment content corresponding to no location information and comment content that corresponds to location information but whose corresponding location indicated by the location information is not found from all the pages occupied by the article.

The following uses an example in which the article is viewed in a specified content comment mode, to describe an implementation process in a specified content comment mode. First, the user enables a specified content comment mode, and the client sends an obtaining request including the to-be-displayed article of the article index information and the comment content of the article to the server. After the server receives the obtaining request, the server searches a database and returns the to-be-displayed article corresponding to the index information and the comment content of the article. The client finds, from the comment content returned by the server, the comment content corresponding to the location information. According to the location information corresponding to the found comment content, the client finds, in the DOM tree of all the pages occupied by the article, the DOM node that corresponds to the specified content corresponding to the comment content, inserts the new node before, after, or in the middle location of the found DOM node, and inserts the comment content to the new node for display.

To ensure reading coherence of the article, preferably, a DOM node is established for content of each paragraph, content of each chapter, and the like of the article. All DOM nodes jointly form the DOM tree of all the pages occupied by the article, that is, the comment content is displayed at a neighboring location of a paragraph or a chapter of the specified content, as shown in FIG. 12. In consideration that excessive inserted comment content also affects reading coherence, during implementation, a foldable column may be used, and only one or two inserted comments are displayed. If the user hopes to continue to read comment content, the user clicks to extend the foldable column; otherwise, the user may continue to read the main body of news.

Sixth Embodiment

FIG. 13 is a flowchart of a network article comment processing method according to a sixth embodiment of the present disclosure. Referring to FIG. 13, a processing procedure of a server is described in this embodiment.

Step S601: A server receives comment content and a location at which specified content corresponding to the comment content is located with respect to all pages occupied by an article, where the comment content and the location are sent by at least one client.

After the server receives comment content and a location at which specified content corresponding to the comment content is located with respect to all the pages occupied by the article, the server stores the comment content and the location, where the comment content and the location are uploaded by each client interacting with the server. Information uploaded by multiple clients for a same article may be stored in one database.

Step S602: Store the comment content and the location at which the specified content corresponding to the comment content is located with respect to all the pages occupied by the article.

Preferably, the comment content and the location at which the specified content corresponding to the comment content is located with respect to all the pages occupied by the article are stored by using a preset format. For the preset format, refer to the first embodiment to the fourth embodiment.

It should be noted that, the manner of storing the comment content and the location at which the specified content corresponding to the comment content is located with respect to all the pages occupied by the article by using a preset format may be: the client sends the comment content and the specified content corresponding to the comment content to the server by using the preset format, and the server directly stores content of the preset format, as described in the first embodiment to the fourth embodiment. Alternatively, after the client sends the comment content and the location at which the specified content corresponding to the comment content is located with respect to all the pages occupied by the article to the server, the server may store the received content after performing serialization by using the preset format. In this case, as shown in FIG. 14, the method may further include the following steps.

Step S603: Respond to a comment content obtaining request sent by the client.

During implementation, the server may be only configured to receive and store information sent by the client, and return information to the client according to the obtaining request of the client. The client finds comment content corresponding to the location information from the comment content; finds, from all the pages occupied by the article and according to the location information corresponding to the found comment content, a location at which specified content corresponding to the comment content is located with respect to all the pages occupied by the article; and displays the comment content at the corresponding location. Alternatively, the server may not only be configured to receive and store information sent by the client, but may also be configured to: when receiving the obtaining request of the client, find, from the comment content, the comment content corresponding to the location information, find, according to the location information corresponding to the found comment content and on all the pages occupied by the article, the location at which the specified content corresponding to the comment content is located with respect to all the pages occupied by the article, insert the comment content to the corresponding location, and return the article to the client.

Figure 14:
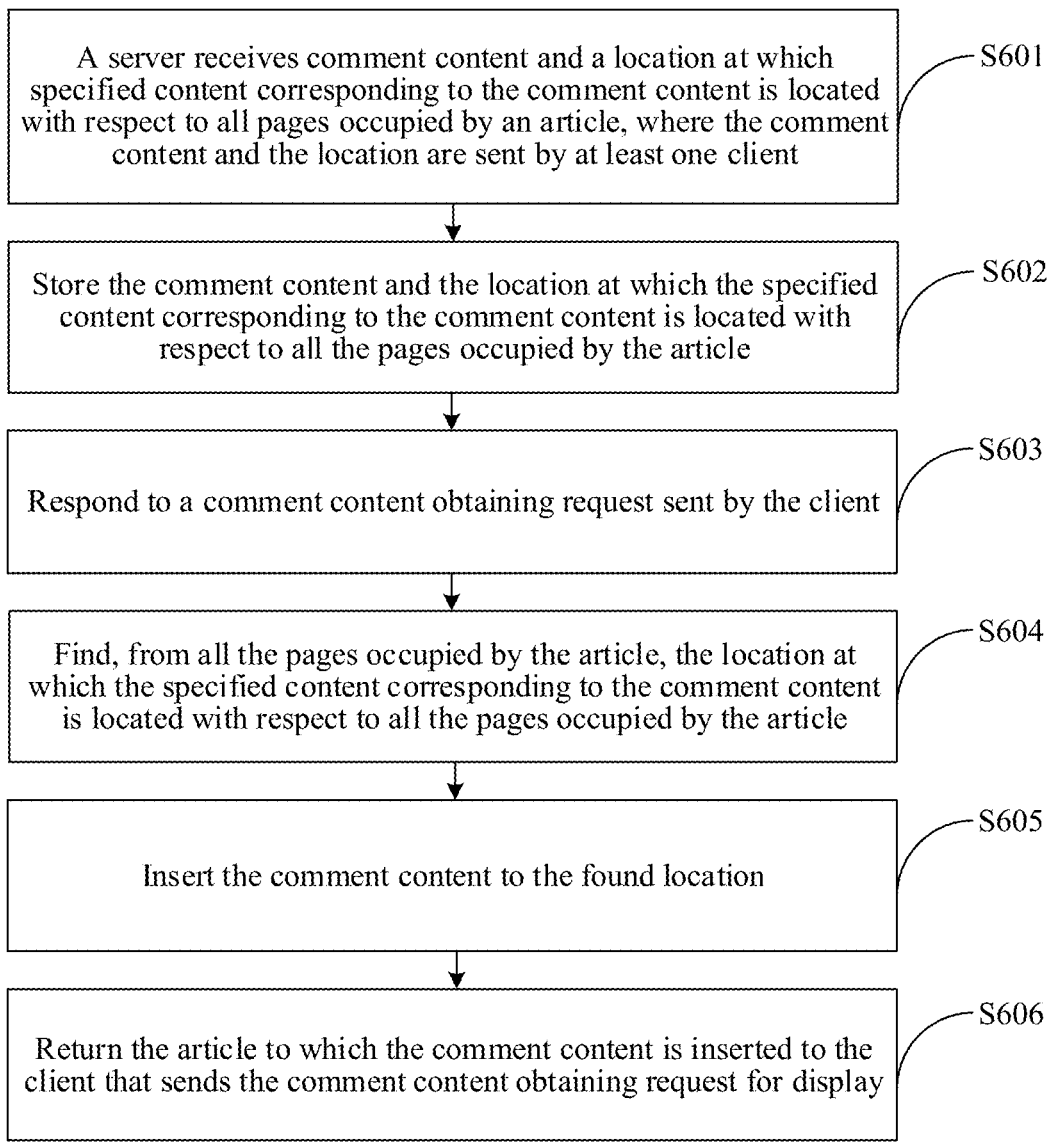
FIG. 14 is a schematic flowchart of another comment processing method according to the sixth embodiment of the present disclosure.

As shown in FIG. 14, when the server searches for the location at which the specified content corresponding to the comment content is located with respect to all the pages occupied by the article, the server pre-stores the article, and the method may further include the following steps.

Step S604: The server finds, from all the pages occupied by the article, the location at which the specified content corresponding to the comment content is located with respect to all the pages occupied by the article.

The location at which the specified content corresponding to the comment content is located with respect to all the pages occupied by the article is preferably a DOM node that corresponds to the specified content corresponding to the comment content and that is in the DOM tree of all the pages occupied by the article. In this step, the server finds, from all the pages occupied by the article, a DOM node that corresponds to the specified content corresponding to the comment content and that is in a DOM tree of all the pages occupied by the article.

To ensure that information returned by the server to the client is content that the user wants to view, when entering a specified content comment mode, preferably, the server receives article index information that is of a to-be-displayed article and that is sent by the client. After the server receives the obtaining request sent by the client, the server searches a database according to the index information and returns content corresponding to the index information of the to-be-displayed article.

Step S605: Insert the comment content to the found location.

In this step, preferably, the server inserts a new node to a neighboring location of the found DOM node; and inserts the comment content to the new node. For a manner of inserting a new node, refer to the fifth embodiment, and details are not described herein again.

Step S606: Return the article to which the comment content is inserted to the client that sends the comment content obtaining request for display.

For methods for searching for the location at which the specified content corresponding to the comment content is located with respect to all the pages occupied by the article, displaying the comment content, and the like, refer to the descriptions in the first embodiment to the fifth embodiment, and details are not described herein again.

In the second embodiment to the sixth embodiment, to ensure that a display form of a newly inserted node is the same as that of an original webpage comment node, preferably, the newly inserted node and the original comment node use a same class.

Seventh Embodiment

Figure 15:
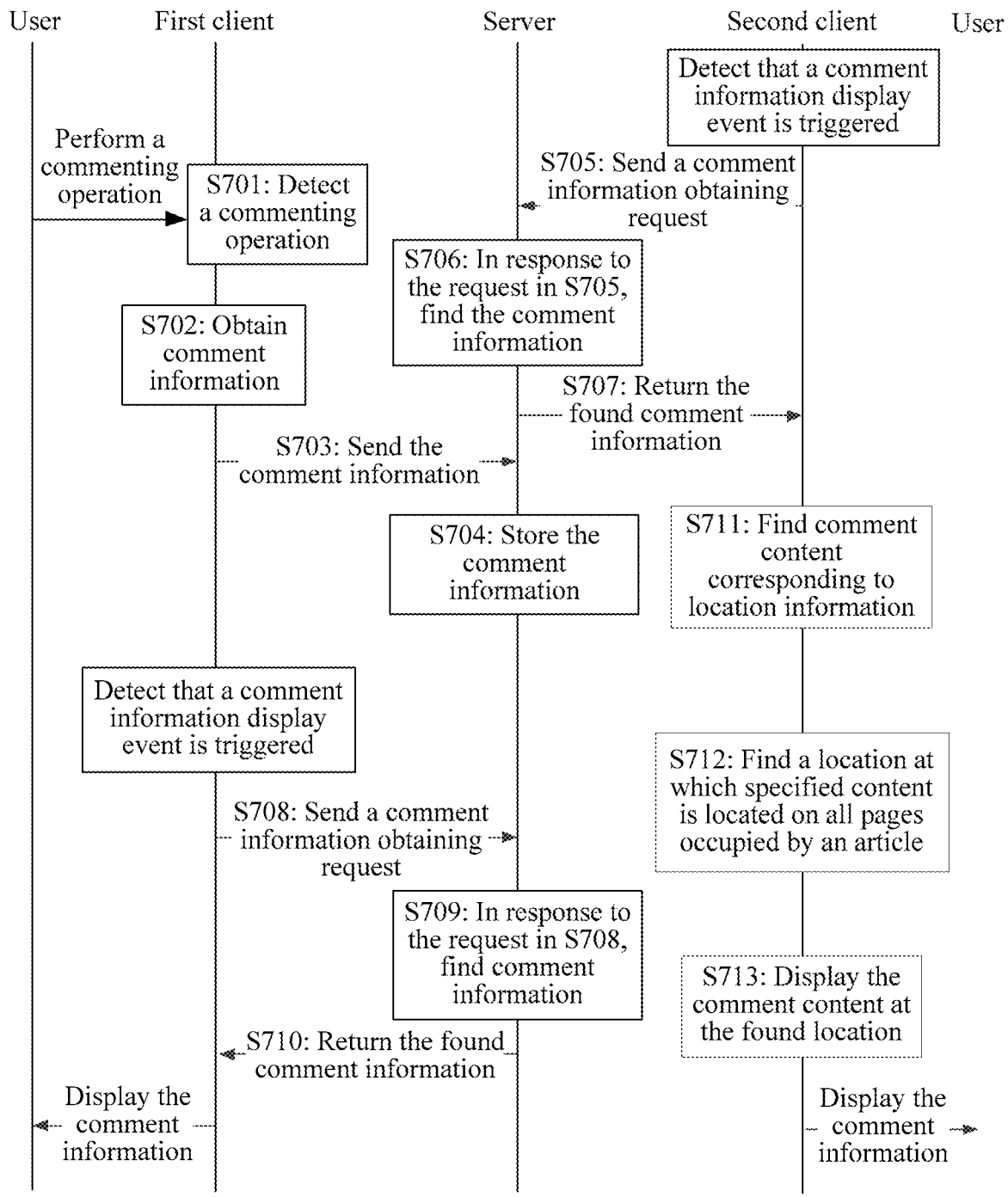
FIG. 15 is a time sequence diagram of a comment processing method according to a seventh embodiment of the present disclosure.

FIG. 15 is a time sequence diagram of a network article comment processing method according to a seventh embodiment of the present disclosure. Referring to FIG. 15, a procedure of interaction between a client and a server is described in this embodiment. Step S701 to step S704 correspond to a process of interaction between a first client and a server in a process in which the first client receives comment information of a commenting operation entered by a user, to obtain corresponding comment information and send the comment information to the server. Step S705 to step S707 correspond to a process of interaction between a second client and the server after the second client detects that a comment display event is triggered. Step S711 to step S713 correspond to a processing process after the second client obtains information returned by the server. Step S708 to step S710 correspond to a process of interaction between the first client and the server after the first client detects that a comment display event is triggered. After the first client receives comment information returned by the server, similar to the second client, the first client performs step S711 to step S713, and details are not described herein again. It should be noted that, these three interaction processes do not conflict with each other, and may be performed simultaneously or may be sequentially performed. The steps shown in FIG. 15 may be performed in a sequence different from that shown in the accompanying drawing, for example, step S708 to step S710 may be performed before step S701.

Refer to FIG. 15. Step S701: A first client detects, in a process of displaying a current article, a commenting operation performed by a user on a page displayed on a display screen.

In this embodiment, the commenting operation includes that a user selects specified content and posts comment content for the specified content on the page displayed on the display screen.

Step S702: The first client obtains comment information.

In this embodiment, the comment information includes a location at which the specified content of the user in the article is located on all the pages occupied by the article, and the comment content posted by the user for the specified content.

Step S703: The first client sends the comment information to a server.

Step S704: The server receives and stores the comment information sent by the first client.

Step S705: A second client detects that a comment information display event is triggered, and sends a comment information obtaining request to the server.

Step S706: In response to the comment information obtaining request sent by the second client, the server searches for comment information corresponding to the comment information obtaining request.

Step S707: Return the found comment information to the second client.

When the second client detects that a comment information display event is triggered, the second client sends a comment information obtaining request to the server.

Step S708: The first client detects that a comment information display event is triggered, and sends a comment information obtaining request to the server.

Step S709: In response to the comment information obtaining request sent by the first client, the server searches for comment information corresponding to the comment information obtaining request.

Step S710: Return the found comment information to the first client.

After receiving the comment information returned by the server, both the first client and the second client perform the following operations. In this embodiment, an operation performed by the second client is used as an example for description.

Step S711: The second client receives the comment information returned by the server, and finds, from the comment information, comment content corresponding to location information.

Step S712: Find, from all the pages occupied by the article and according to the location information corresponding to the found comment content, a location at which specified content corresponding to the comment content is located with respect to all the pages occupied by the article.

Step S713: Display the comment content at the found location.

Eighth Embodiment

Figure 16:
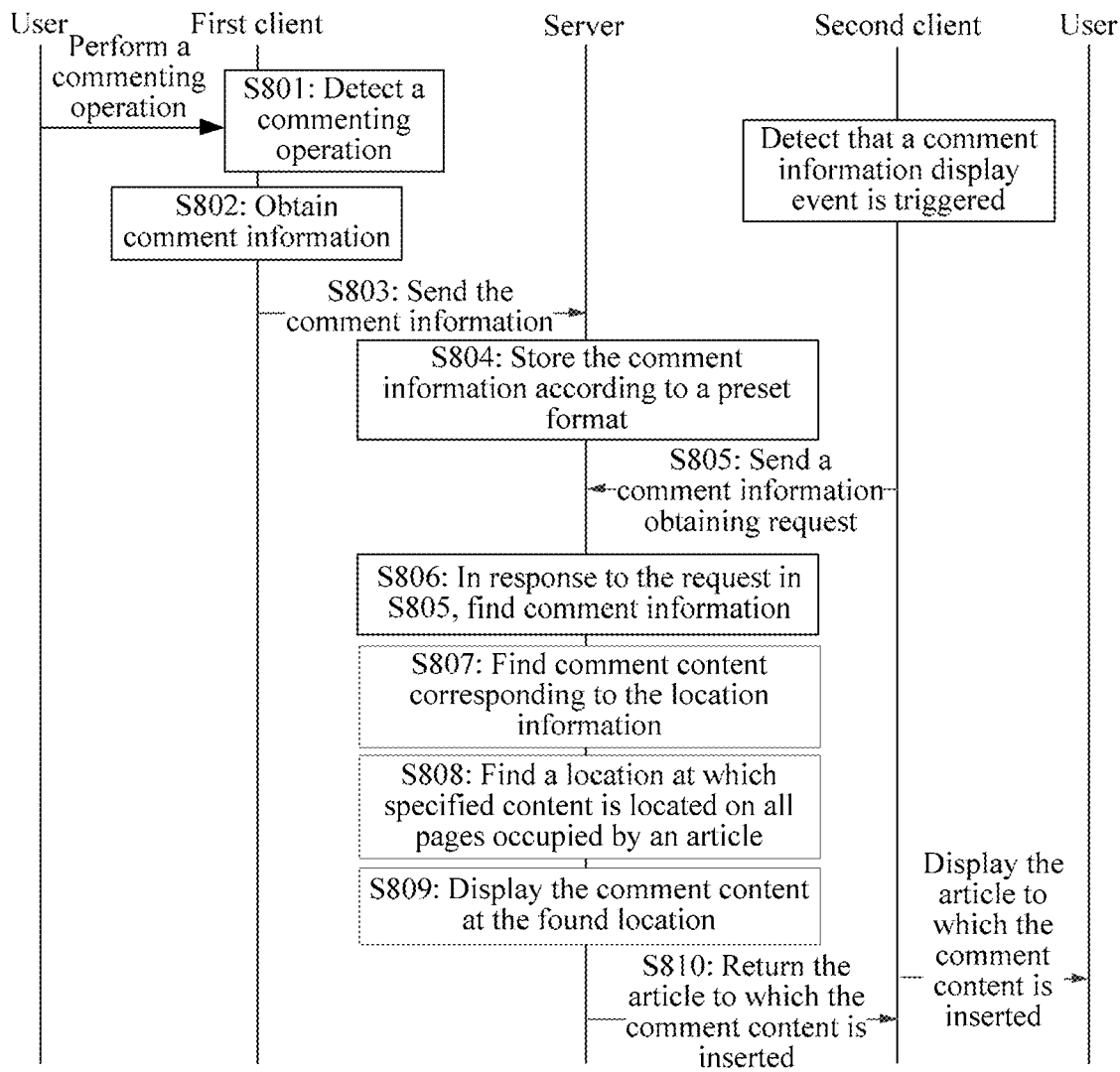
FIG. 16 is a time sequence diagram of a comment processing method according to an eighth embodiment of the present disclosure.

FIG. 16 is a time sequence diagram of a network article comment processing method according to an eighth embodiment of the present disclosure. Referring to FIG. 16, a procedure of interaction between a client and a server is described in this embodiment. Step S801 to step S804 correspond to a process of interaction between a first client and a server in a process in which the first client receives comment information of a commenting operation entered by a user, to obtain corresponding comment information and send the comment information to the server. Step S805 to step S810 correspond to a process of interaction between a second client and the server after the second client detects that a comment display event is triggered. During implementation, after the first client detects that a comment display event is triggered, a process of interaction between the first client and the server is the same as that between the second client and the server, the first client performs step S805 to step S810, and details are not described herein again. It should be noted that, the foregoing interaction processes do not conflict with each other, and may be performed simultaneously or may be sequentially performed. The steps shown in FIG. 16 may be performed in a sequence different from that shown in the accompanying drawing, for example, step S805 to step S810 may be performed before step S801.

Refer to FIG. 16. Step S801: A first client detects, in a process of displaying a current article, a commenting operation performed by a user on a page displayed on a display screen.

In this embodiment, the commenting operation includes that a user selects specified content and posts comment content for the specified content on the page displayed on the display screen.

Step S802: The first client obtains comment information.

In this embodiment, the comment information includes a location at which the specified content of the user in the article is located on all the pages occupied by the article, and the comment content posted by the user for the specified content.

Step S803: The first client sends the comment information to a server.

Step S804: The server receives and stores, by using a preset format, the comment information sent by the first client.

For the preset format, refer to the description in the fourth embodiment, and details are not described herein again.

A manner that the first client sends a comment information obtaining request to the server when detecting that a comment information display event is triggered is similar to a manner that the second client sends a comment information obtaining request to the server when detecting that a comment information display event is triggered. In this embodiment, a step performed by the second client to send a comment information obtaining request to the server is used as an example for description.

Step S805: A second client detects that a comment information display event is triggered, and sends a comment information obtaining request to the server.

Step S806: In response to the comment information obtaining request sent by the second client, the server searches for comment information corresponding to the comment information obtaining request.

Step S807: The server finds comment content corresponding to the location information from the comment content.

Step S808: The server finds, from all the pages occupied by the article and according to the location information corresponding to the found comment content, a location at which specified content corresponding to the comment content is located with respect to all the pages occupied by the article.

Step S809: The server inserts the comment content to the found location.

Step S810: The server returns the article to which the comment content is inserted to the second client for display.

Ninth Embodiment

Figure 17:
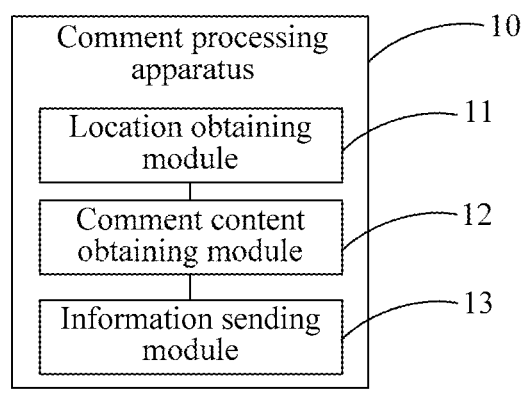
FIG. 17 is a structural block diagram of a comment processing apparatus according to a ninth embodiment of the present disclosure.

FIG. 17 is a structural block diagram of a network article comment processing apparatus 10 according to a ninth embodiment of the present disclosure. Referring to FIG. 17, the apparatus in this embodiment may run on a client (the client is in a user terminal), and is configured to implement the network article comment processing method provided in the first embodiment. The apparatus in this embodiment includes: a location obtaining module 11, a comment content obtaining module 12, and an information sending module 13.

The location obtaining module 11 obtains, in a process of displaying a current article, a location where user specified content in the article is located with respect to all the pages occupied by the article.

The comment content obtaining module 12 obtains comment content posted by the user for the specified content.

The information sending module 13 sends the comment content and the location at which the specified content corresponding to the comment content is located with respect to all the pages occupied by the article to a server.

Figure 18:
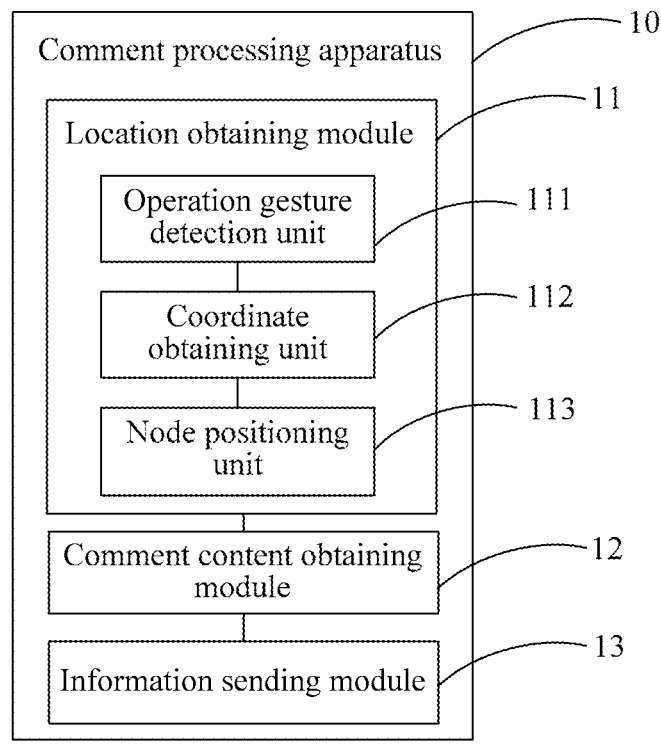
FIG. 18 is a structural block diagram of another comment processing apparatus according to the ninth embodiment of the present disclosure.

In a first comment processing mode, as shown in FIG. 18, the location obtaining module 11 may include: an operation gesture detection unit 111, a coordinate obtaining unit 112, and a node positioning unit 113.

The operation gesture detection unit 111 detects, in the process of displaying the current article, an operation gesture of the user for the article, where the operation gesture is used to select the specified content. The coordinate obtaining unit 112 obtains coordinates that are of the specified content selected by the user by using the operation gesture and that are on a current page, and coordinates of the current page on all the pages occupied by the article. According to the coordinates that are of the specified content and that are on the current page and the coordinates of the current page on all the pages occupied by the article, the node positioning unit 113 positions, in a DOM tree of all the pages occupied by the article, a DOM node corresponding to the specified content.

Figure 19:
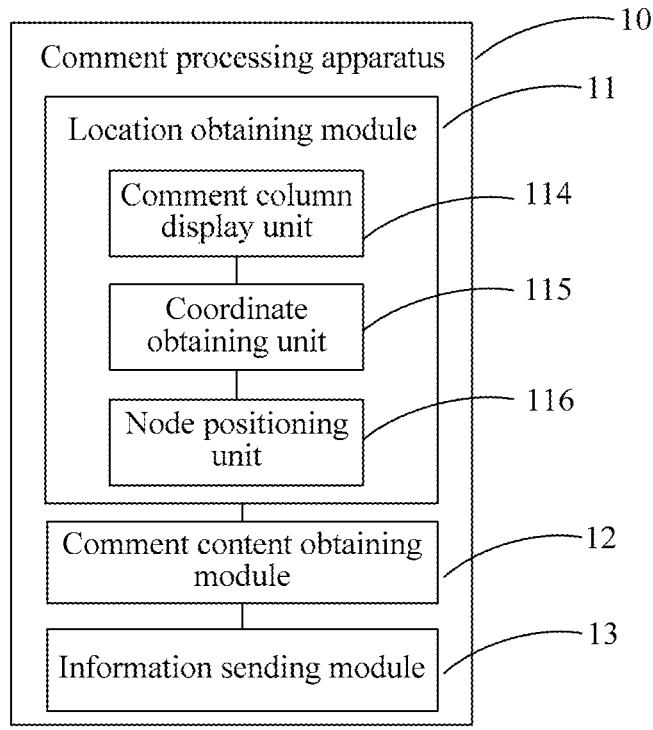
FIG. 19 is a structural block diagram of another comment processing apparatus according to the ninth embodiment of the present disclosure.

In a second comment processing mode, as shown in FIG. 19, the location obtaining module 11 may include: a comment column display unit 114, a coordinate obtaining unit 115, and a node positioning unit 116.

The comment column display unit 114 displays, in the process of displaying the current article, a comment column on a preset location of a current page. The coordinate obtaining unit 115 obtains coordinates of the current page on all the pages occupied by the article when the comment content is posted. According to the preset location and the coordinates of the current page on all the pages occupied by the article, the node positioning unit 116 positions, in a DOM tree of all the pages occupied by the article, a DOM node corresponding to the comment column. The specified content is content that the comment column points to and that is in the article when the comment content is posted, and the location at which the specified content is located on all the pages occupied by the article is the DOM node that corresponds to the comment column and that is in the DOM tree of all the pages occupied by the article. The comment content obtaining module 12 obtains comment content posted by the user in the comment column.

Figure 20:
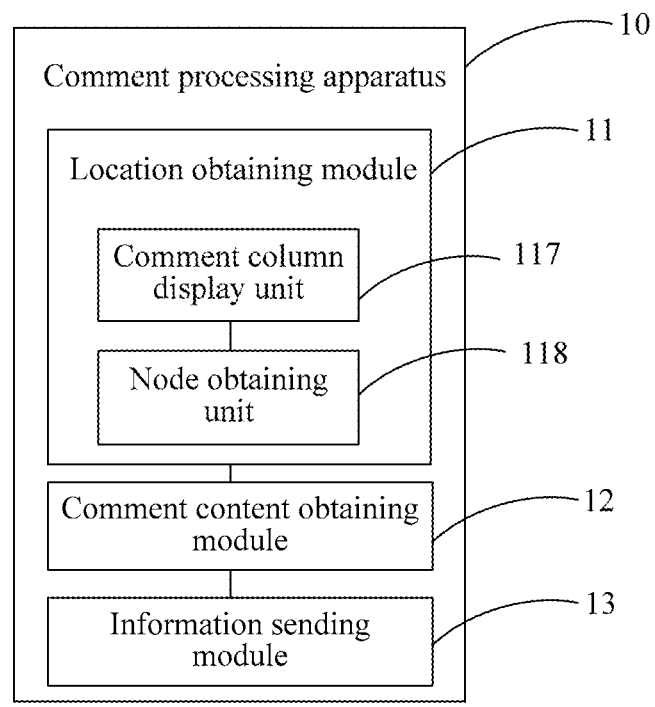
FIG. 20 is a structural block diagram of another comment processing apparatus according to the ninth embodiment of the present disclosure.

In a third comment processing mode, as shown in FIG. 20, the location obtaining module 11 may include a comment column display unit 117 and a node obtaining unit 118.

The comment column display unit 117 separately displays, in the process of displaying the current article, multiple comment columns at various locations of all the pages occupied by the article, where the multiple comment columns are in a one-to-one correspondence with various DOM nodes in a DOM tree of all the pages occupied by the article.

The node obtaining unit 118 obtains the DOM node that corresponds to the comment column in which the comment content is posted and that is in the DOM tree of all the pages occupied by the article, and uses the obtained DOM node as the location at which the specified content is located on all the pages occupied by the article.

The comment content obtaining module 12 obtains comment content posted by the user in any comment column, where the specified content is content that is in the article and that is on a DOM node corresponding to a comment column in which the comment content is posted.

Further, in this embodiment, preferably, the information sending module 13 is configured to send the comment content and the DOM node that corresponds to the specified content corresponding to the comment content and that is in the DOM tree of all the pages occupied by the article to a server. For example, the information sending module 13 is specifically configured to send the comment content and the location at which the specified content corresponding to the comment content is located on all the pages occupied by the article to a server by using a preset format. The preset format may include: a keyword identifier, a location identifier, and comment content. The location identifier defines the location at which the specified content corresponding to the comment content is located on all the pages occupied by the article, and the keyword identifier defines that the comment content is comment content having a location identifier.

Tenth Embodiment

Figure 21:
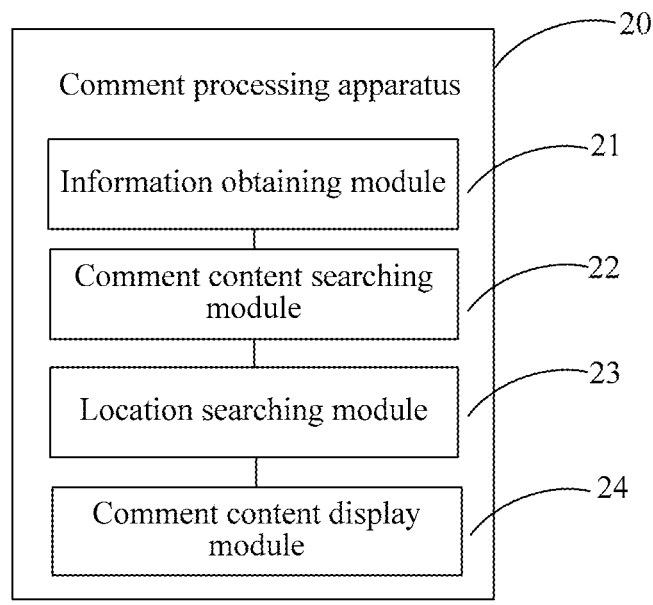
FIG. 21 is a structural block diagram of a comment processing apparatus according to a tenth embodiment of the present disclosure.

FIG. 21 is a structural block diagram of a network article comment processing apparatus 20 according to a tenth embodiment of the present disclosure. Referring to FIG. 21, the apparatus in this embodiment may run on a client (the client is in a user terminal), and is configured to implement the network article comment processing method provided in the fifth embodiment. The comment processing apparatus 20 in this embodiment includes: an information obtaining module 21, a comment content searching module 22, a location searching module 23, and a comment content display module 24.

The information obtaining module 21 obtains a to-be-displayed article and comment content of the article from a server, where the comment content includes comment content corresponding to location information, and the location information defines a location at which specified content corresponding to the comment content is located with respect to all pages occupied by the article.

The comment content searching module 22 finds comment content corresponding to the location information from the comment content.

The location searching module 23 finds, from all the pages occupied by the article and according to the location information corresponding to the found comment content, a location at which specified content corresponding to the comment content is located on all the pages occupied by the article.

The comment content display module 24 displays the comment content at the found location.

In this embodiment, the location at which the specified content corresponding to the comment content is located on all the pages occupied by the article is a DOM node that corresponds to the specified content corresponding to the comment content and that is in the DOM tree of all the pages occupied by the article.

The location searching module 23 finds, from all the pages occupied by the article and according to the location information corresponding to the found comment content, a DOM node that corresponds to specified content corresponding to the comment content and that is in a DOM tree of all the pages occupied by the article.

Figure 22:
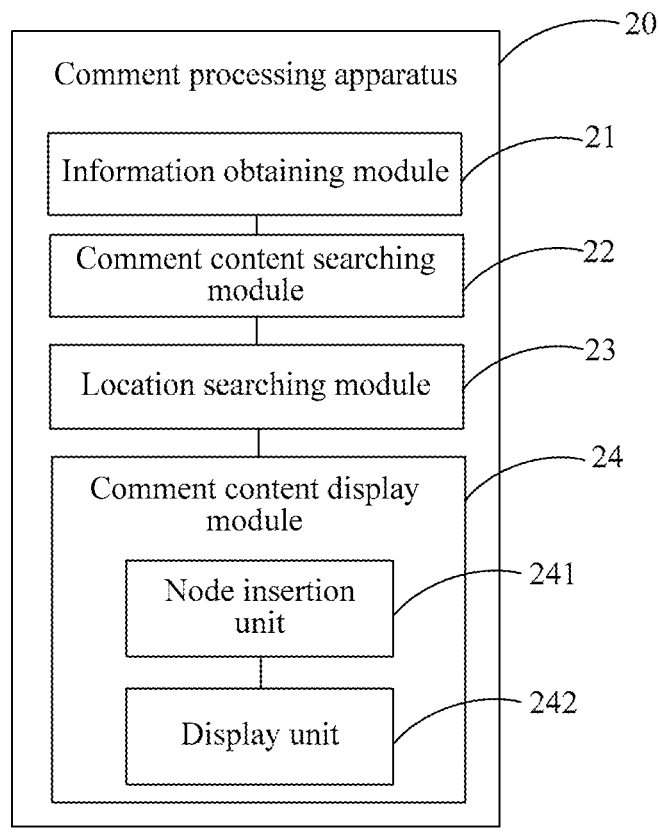
FIG. 22 is a structural block diagram of another comment processing apparatus according to the tenth embodiment of the present disclosure.

Further, as shown in FIG. 22, the comment content display module 24 may include a node insertion unit 241 and a node display unit 242.

The node insertion unit 241 inserts a new node to a neighboring location of the found DOM node. The display unit 242 inserts the comment content to the new node for display.

In this embodiment, preferably, the comment content corresponding to the location information may include: a keyword identifier, a location identifier, and comment content, the location identifier defines the location at which the specified content corresponding to the comment content is located on all the pages occupied by the article, and the keyword identifier defines that the comment content is comment content having a location identifier. The comment content searching module 22 may find, from the comment content according to the keyword identifier, comment content including a location identifier.

During implementation, the comment content may further include comment content corresponding to no location information. In this case, the comment content display module 24 may further display, at the bottom of all the pages occupied by the article, the comment content corresponding to no location information and comment content, where a location at which specified content corresponding to the comment content is located on all the pages occupied by the article is not found by the location searching module 23 from all the pages occupied by the article.

Eleventh Embodiment

Figure 23:
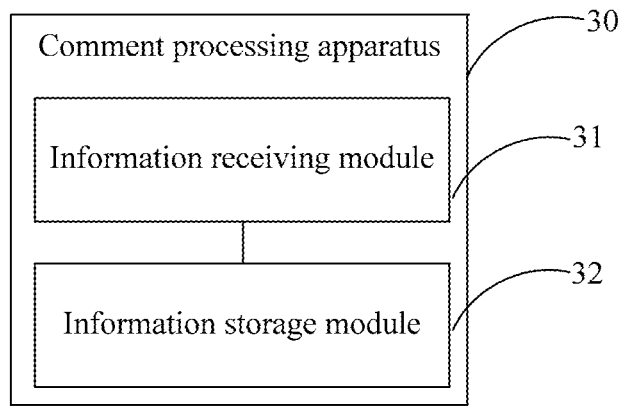
FIG. 23 is a structural block diagram of a comment processing apparatus according to an eleventh embodiment of the present disclosure.

FIG. 23 is a structural block diagram of a network article comment processing apparatus 30 according to an eleventh embodiment of the present disclosure. Referring to FIG. 23, the apparatus in this embodiment may run on a server, and is configured to implement the network article comment processing method provided in the sixth embodiment. The comment processing apparatus 30 in this embodiment includes an information receiving module 31 and an information storage module 32.

The information receiving module 31 receives comment content and a location at which specified content corresponding to the comment content is located on all pages occupied by an article, where the comment content and the location are sent by at least one client.

The information storage module 32 stores the comment content and the location at which the specified content corresponding to the comment content is located on all the pages occupied by the article.

Figure 24:
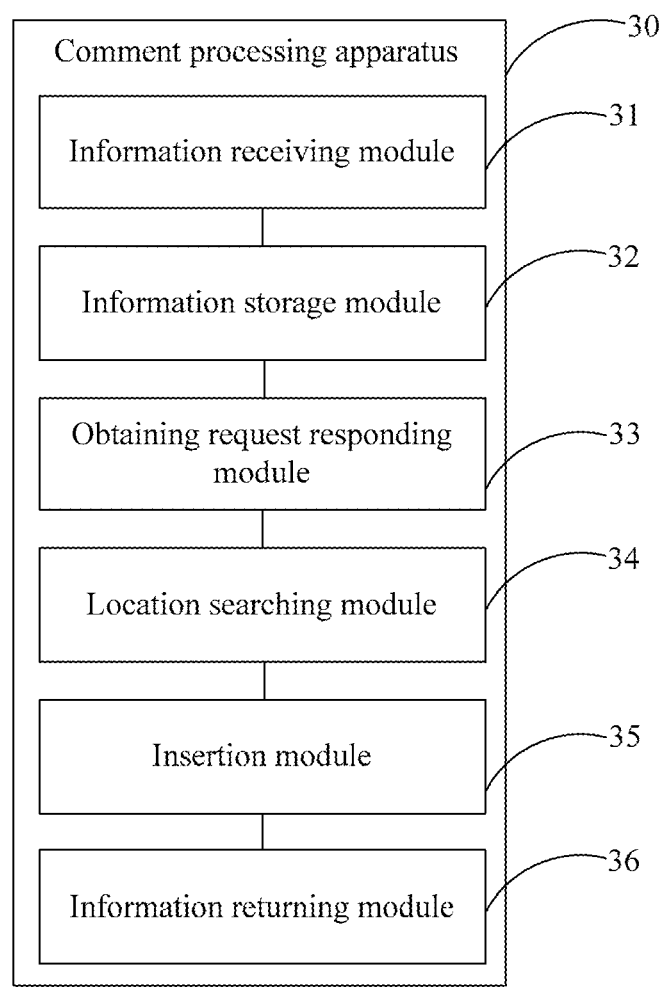
FIG. 24 is a structural block diagram of another comment processing apparatus according to the eleventh embodiment of the present disclosure.

Further, as similar to the sixth embodiment, in the eleventh embodiment, after the client sends the comment content and the location at which the specified content corresponding to the comment content is located on all the pages occupied by the article to the server, the server may store the received content after performing serialization by using the preset format. In this case, the information storage module 32 may pre-store the article. As shown in FIG. 24, the apparatus may further include: an obtaining request responding module 33, a location searching module 34, an insertion module 35, and an information returning module 36.

The obtaining request responding module 33 responds to a comment content obtaining request sent by the client. The location searching module 34 finds, from all the pages occupied by the article, the location at which the specified content corresponding to the comment content is located on all the pages occupied by the article. The insertion module 35 inserts the comment content to the found location. The information returning module 36 returns the article to which the comment content is inserted to the client that sends the comment content obtaining request for display.

In this embodiment, the location at which the specified content corresponding to the comment content is located on all the pages occupied by the article preferably includes a DOM node that corresponds to the specified content corresponding to the comment content and that is in the DOM tree of all the pages occupied by the article. The location searching module 34 finds, from all the pages occupied by the article, a DOM node that corresponds to the specified content corresponding to the comment content and that is in a DOM tree of all the pages occupied by the article.

Figure 25:
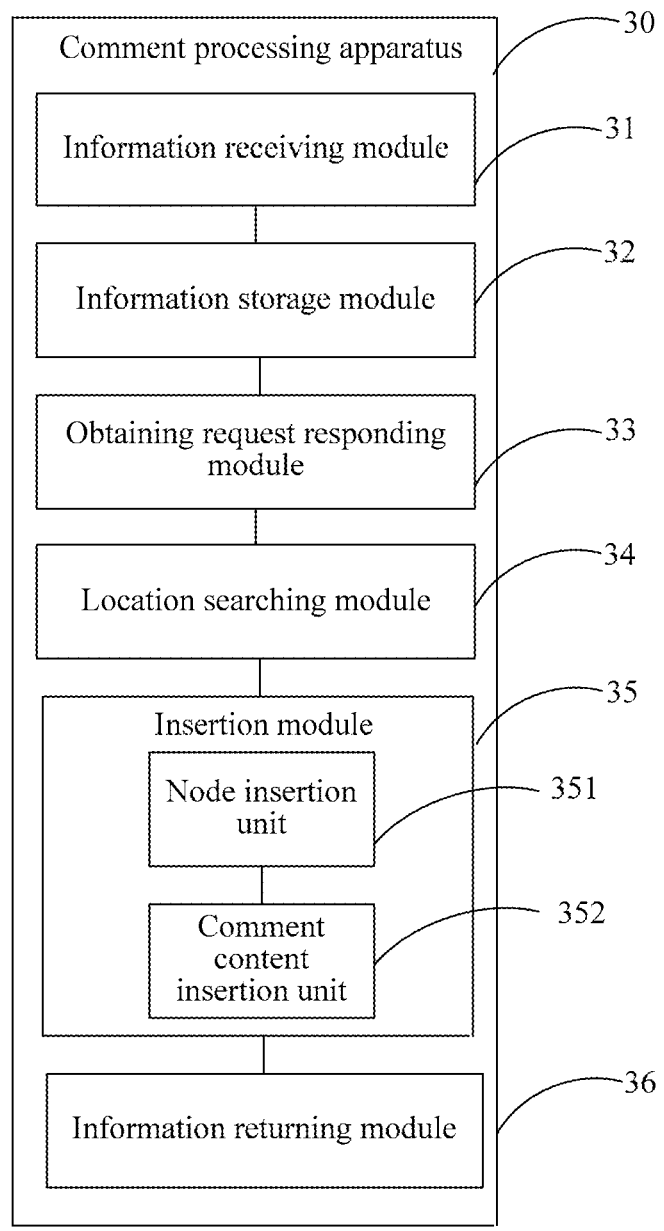
FIG. 25 is a structural block diagram of another comment processing apparatus according to the eleventh embodiment of the present disclosure.

Further, as shown in FIG. 25, the insertion module 35 may include a node insertion unit 351 and a comment content insertion unit 352.

The node insertion unit 351 inserts a new node to a neighboring location of the found DOM node. The comment content insertion unit 352 inserts the comment content to the new node.

In this embodiment, preferably, the information storage module 32 may store, by using a preset format, the comment content and the location at which the specified content corresponding to the comment content is located on all the pages occupied by the article. The preset format may include: a keyword identifier, a location identifier, and comment content. The location identifier defines the location at which the specified content corresponding to the comment content is located on all the pages occupied by the article, and the keyword identifier defines that the comment content is comment content having a location identifier.

In the ninth embodiment to the eleventh embodiment, each module may be implemented by using software code. In this case, each module may be stored in the memory 102 of the user terminal 100. The foregoing modules may also be implemented by hardware such as an integrated circuit chip.

Twelfth Embodiment

Figure 26:
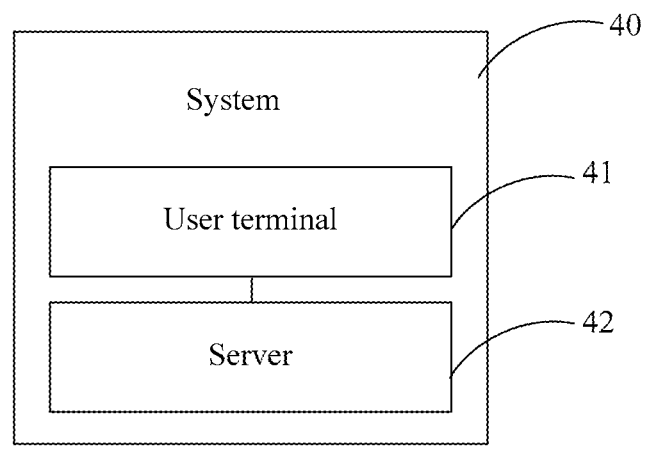
FIG. 26 is a structural block diagram of a comment processing system according to a twelfth embodiment of the present disclosure.

FIG. 26 is a structural block diagram of a network article comment processing system 40 according to a twelfth embodiment of the present disclosure. Referring to FIG. 26, the system in this embodiment may be configured to implement the comment processing method provided in the first embodiment to the sixth embodiment. The comment processing system 40 in this embodiment may include a user terminal 41 and a server 42.

During implementation, optionally, the apparatus in the ninth embodiment and the tenth embodiment may run in a user terminal. A client in the user terminal sends the comment content and the location at which the specified content corresponding to the comment content is located with respect to all the pages occupied by the article to the server by using a preset format. The server directly stores the content of the preset format, and when obtaining a comment content obtaining request sent by the client, the server returns the comment content of the preset format to the client. The client finds the location at which the specified content corresponding to the comment content is located with respect to all the pages occupied by the article, and displays the comment content at the found location.

Optionally, the apparatus in the eleventh embodiment may run in a server, and the server may store the received content after performing serialization by using the preset format. When obtaining the comment content obtaining request sent by the client, the server finds the location at which the specified content corresponding to the comment content is located with respect to all the pages occupied by the article, inserts the comment content to the found location, and returns the article to which the comment content is inserted to the client that sends the comment content obtaining request, to perform display. In this case, the client only needs to send the comment content obtaining request to the server when detecting, when displaying the current article or in a process of displaying the current article, that a comment content display event is triggered; receives and displays the article that is obtained after corresponding comment content is inserted to the current article and that is returned by the server, and displays the comment content at the location at which the specified content corresponding to the comment content is located with respect to all the pages occupied by the article.

Thirteenth Embodiment

Figure 27:
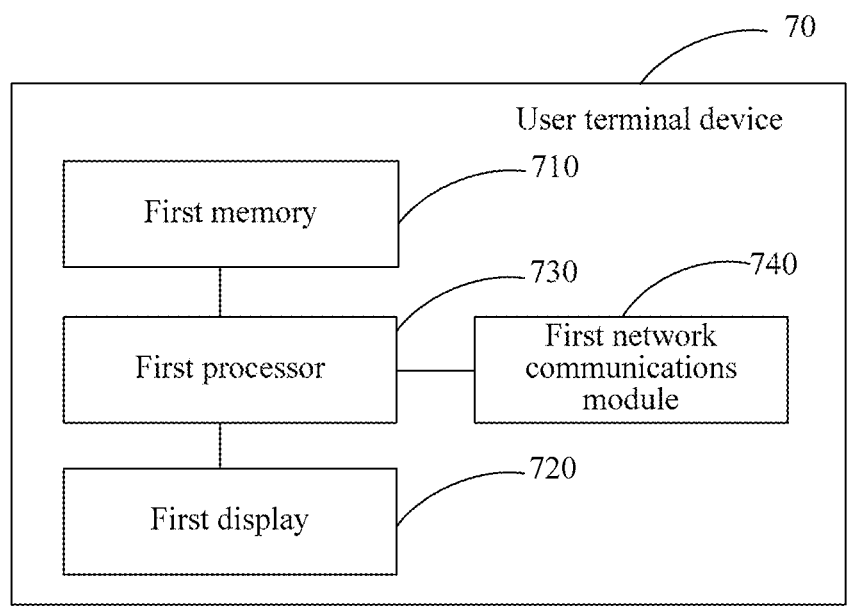
FIG. 27 is a structural block diagram of a user terminal device according to a thirteenth embodiment of the present disclosure.

FIG. 27 is a structural block diagram of a user terminal device according to a thirteenth embodiment of the present disclosure. Referring to FIG. 27, the user terminal device in this embodiment may be configured to implement the comment processing method provided in the first embodiment to the fourth embodiment. The user terminal device 70 in this embodiment includes: a first memory 710, a first display 720, a first processor 730, and a first network communications module 740.

The first display 720 may display an article.

The first processor 730 obtains a location where user specified content in the article displayed on the first display 720 is located with respect to all pages occupied by the article, and obtains comment content posted by the user for the specified content; and stores the location at which the specified content is located on all the pages occupied by the article and the comment content in the first memory 710.

In response to a sending instruction of the first processor 730, the first network communications module 740 sends the comment content and the location at which the specified content corresponding to the comment content is located on all the pages occupied by the article to a server.

In addition, the components of the user terminal device 70 in this embodiment may further cooperate with each other to implement content that is described in the comment processing method provided in the first embodiment to the fourth embodiment and that is not described herein.

Fourteenth Embodiment

Figure 28:
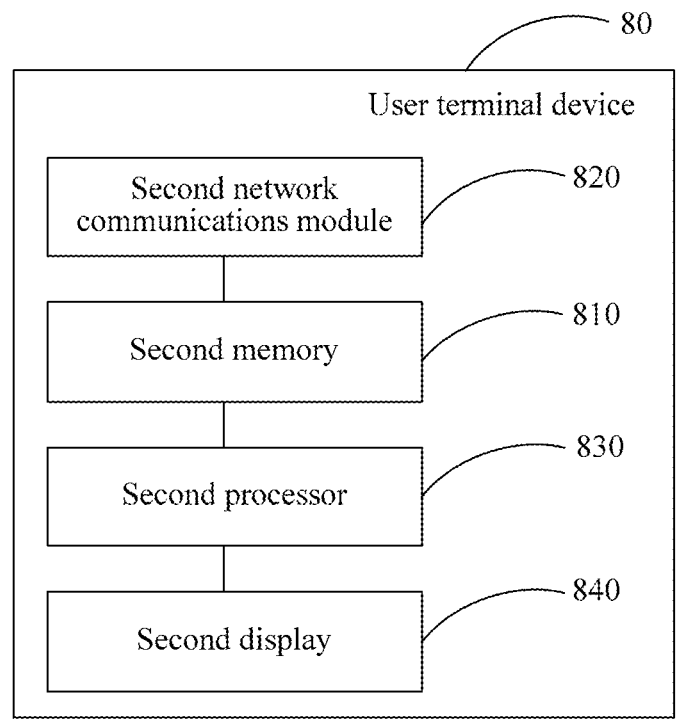
FIG. 28 is a structural block diagram of another user terminal device according to a fourteenth embodiment of the present disclosure.

FIG. 28 is a structural block diagram of a user terminal device according to a fourteenth embodiment of the present disclosure. Referring to FIG. 28, the user terminal device 80 in this embodiment may be configured to implement the comment processing method provided in the fifth embodiment. The user terminal device 80 in this embodiment includes: a second memory 810, a second network communications module 820, a second processor 830, and a second display 840.

The second network communications module 820 obtains a to-be-displayed article and comment content of the article from a server, and stores the article and the comment content in the second memory 810, where the comment content includes comment content corresponding to location information, and the location information defines a location at which specified content corresponding to the comment content is located with respect to all pages occupied by the article.

The second processor 830 finds comment content corresponding to the location information from the comment content stored in the second memory 810; and finds, from all the pages occupied by the article and according to the location information corresponding to the found comment content, a location at which specified content corresponding to the comment content is located with respect to all the pages occupied by the article.

The second display 840 displays the article, and displays the comment content at the location found by the second processor 830.

In addition, the components of the user terminal device 80 in this embodiment may further cooperate with each other to implement content that is described in the comment processing method provided in the fifth embodiment and that is not described herein.

Fifteenth Embodiment

Figure 29:
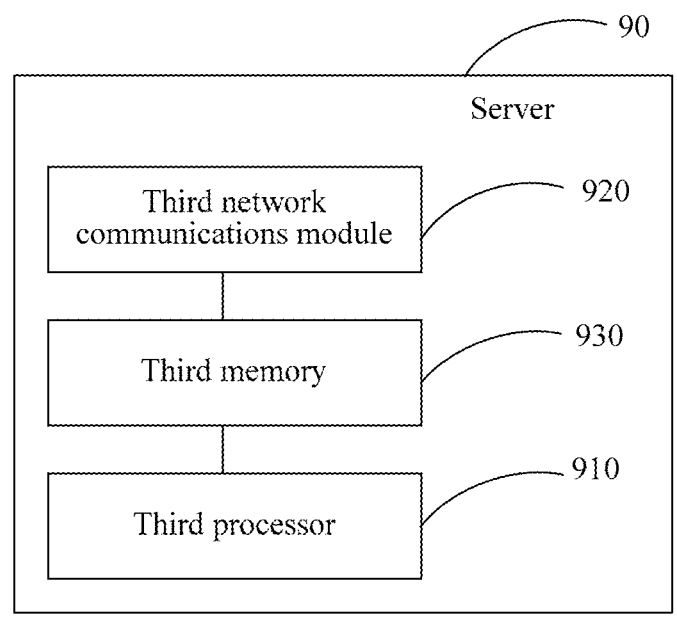
FIG. 29 is a structural block diagram of a server according to a fifteenth embodiment of the present disclosure.

FIG. 29 is a structural block diagram of a server according to a fifteenth embodiment of the present disclosure. Referring to FIG. 29, the server 90 in this embodiment may be configured to implement the comment processing method provided in the sixth embodiment. The server 90 in this embodiment includes: a third memory 910, a third network communications module 920, and a third processor 930. The third processor 930 is connected to the third memory 910 and the third network communications module 920.

The third processor 930 instructs the third network communications module 920 to receive comment content and a location at which specified content corresponding to the comment content is located with respect to all pages occupied by the article, where the comment content and the location are sent by at least one client; and store the comment content and the location at which the specified content corresponding to the comment content is located with respect to all the pages occupied by the article in the third memory 910.

In addition, the components of the server 90 in this embodiment may further cooperate with each other to implement content that is described in the comment processing method provided in the sixth embodiment and that is not described herein.

It should be noted that "the first", "the second", "the third" described in the thirteenth embodiment, the fourteenth embodiment, and the fifteenth embodiment are only for distinguishing purposes, and shall not be understood as limitation on the present disclosure. In addition, all the embodiments in this specification are described by using the progressive method. Each embodiment mainly describes only the difference from other embodiments. For the same or similar parts among all the embodiments, refer to the relevant parts.

An implementation principle and a technical effect of the network article comment processing apparatus and system provided in the embodiments of the present disclosure are the same as those in the foregoing method embodiments. For the purpose of concise description, for parts not described in the apparatus and system embodiments, refer to corresponding content in the method embodiment.

A person skilled in the art may clearly know that the technology in the embodiments of the present disclosure may be implemented by combining software with necessary general-purpose hardware. The general-purpose hardware includes a general-purpose integrated circuit, a general-purpose CPU, a general-purpose memory, a general-purpose device, and the like; or certainly may be implemented by using dedicated hardware including a dedicated integrated circuit, a dedicated CPU, a dedicated memory, a dedicated device, and the like. However, in most cases, the former is a preferred implementation. Based on such an understanding, the technical solutions of the embodiments of the present disclosure essentially, or the part contributing to the prior art may be implemented in a form of a software product. The computer software product may be stored in a storage medium, for example, a read-only memory (ROM), a random access memory (RAM), a magnetic disk, or an optical disk, and includes several instructions for instructing a computer device (which may be a personal computer, a server, or a network device) to perform the methods described in all or some of the embodiments of the present disclosure.

Therefore, the technical design of the present disclosure may be further implemented as a non-transitory machine-readable storage medium storing executable code, the executable code, when executed by a processor, causing the processor to execute the network content quality commenting method described above or execute the method for sequencing multiple network content described above.

According to another aspect, the technical design of the present disclosure may be further implemented as a computing device, and the computing device includes a processor and a non-transitory machine-readable storage medium storing executable code, the executable code, when executed by the processor, causing the processor to execute the method described above.

In addition, a flowchart and a block diagram of the accompanying drawings display possible systems and architectures, functions, and operations of the system, the apparatus, the method, and the computer program product according to the multiple embodiments of the present disclosure. In this point, a flowchart or each block in a block diagram may represent a part of a module, a program segment, or code, and the part of a module, a program segment, or code includes one or more executable instructions for implementing specified logic functions. It should also be noted that, in some implementations as replacements, functions indicated in blocks may also be performed in a sequence different from that indicated in the accompanying drawings. For example, two continuous blocks may actually be performed basically concurrently, or may be performed in an opposite sequence sometimes, and this depends on a related function. It should also be noted that, each block in a block diagram and/or a flowchart, a combination of blocks in a block diagram and/or a flowchart may be implemented by a dedicated hardware-based system that performs a specified function or action, or may be implemented by a combination of dedicated hardware and a computer instruction.

The computer program product provided in the embodiments of the present disclosure includes a computer-readable storage medium storing program code, and an instruction included in the program code may be configured to implement the method in the method embodiment. For a detailed implementation, refer to the method embodiment, and details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. The described apparatus embodiment is merely exemplary. For example, the unit division is merely logical function division and may be other division during actual implementation. For another example, a plurality of units or components may be combined or integrated into another system, or some features may be ignored or not performed. Furthermore, the displayed or discussed mutual couplings or direct couplings or communication connections may be implemented through some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the function is implemented in a form of a software functional module and sold or used as an independent product, the function may be stored in a computer-readable storage medium. Based on such an understanding, the essence of the technical solutions of the present disclosure or the part contributing to the prior art or a part of the technical solutions may be represented by a software product. The computer software product is stored in a storage medium, and includes several instructions for instructing a computer device (which may be a personal computer, a server, or a network device) to perform all or some of the steps of the methods described in the embodiments of the present disclosure. The storage medium includes: various mediums that can store program code, such as a USB flash drive, a removable hard disk, a ROM, a RAM, a magnetic disk, or an optical disc.

It should be noted that, in this specification, relational terms such as "first" and "second" are used only to distinguish an entity or an operation from another entity or another operation, and do not necessarily require or indicate that these entities or operations have any such actual relation or sequence. In addition, terms "including", "comprising", or any other variations thereof intend to indicate non-exclusive inclusion, so that a process, a method, an object, or a device including a series of elements not only includes those elements, but also includes other element not explicitly listed, or further includes elements intrinsic to the process, the method, the object, or the device. Without more limitations, an element defined by a sentence "including a . . . " does not exclude that a process, a method, an object, or a device including the element further includes another same element.

The foregoing describes only preferred embodiments of the present disclosure, and is not used to limit the present disclosure. A person skilled in the art may make various modifications and changes to the present disclosure. Any modification, equivalent replacement, improvement, and the like made within the spirit and principle of the present disclosure shall fall within the protection scope of the present disclosure. It should be noted that: similar reference numerals and letters indicate similar items in the following accompanying drawings. Therefore, once an item is defined in an accompanying drawing, the item does not need to be further defined and explained in subsequent accompanying drawings.

What is claimed is:

1. A network article comment processing method, comprising:
    detecting, by a client in a process of displaying a current article, an operation gesture of a user for selecting user specified content in the current article;
    obtaining coordinates of the user specified content on a current page and coordinates of the current page with respect to all pages of the current article;
    according to the coordinates of the user specified content and the coordinates of the current page, positioning, in a DOM tree representing all the pages occupied by the article, a DOM node containing the user specified content, the positioning the DOM node comprising:
        searching the DOM tree for an ID of a DOM node containing a sentence of the user specified content; and
        in response to the DOM node containing the sentence having no ID, recursively searching one or more parent nodes until a DOM node having an ID is obtained;
    displaying, in response to the detection of the operation gesture, comment content at a neighboring location of the user specified content, the displaying comprising:
        inserting a new node at a neighboring location of the DOM node containing the user specified content; and
        inserting the comment content to the new node;
    hiding the comment content in response to the user finishing posting of the comment content; and
    sending the comment content and the coordinates of the user specified content to a server.

2. The method according to claim 1, wherein the sending the comment content and the coordinates of the user specified content to a server comprises:
    sending the comment content and the coordinates of the user specified content to the server by using a preset format, wherein the preset format comprises: a keyword identifier, a location identifier, and comment content, the location identifier defines the coordinates of the user specified content, and the keyword identifier defines the comment content as comment content having the location identifier.

3. The method according to claim 1, further comprising:
    receiving, by the server, the comment content and the coordinates of the user specified content sent by the client;
    storing the comment content and the coordinates of the user specified content by using a preset format, wherein the preset format comprises: a keyword identifier, a location identifier, and comment content, the location identifier defines the coordinates of the user specified content, and the keyword identifier defines the comment content as comment content having the location identifier;
    re-displaying the comment content in response to the user re-selecting the user specified content;
    detecting comment information related to a commenting operation performed by a second user on the current article displayed on a second client, wherein the comment information includes second coordinates of a second user specified content in the article with respect to all the pages occupied by the article, and second comment content posted by the second user for the second user specified content;
    requesting and receiving the comment information from the server; and
    displaying the second comment content.

4. A network article comment processing apparatus, comprising a processor and a non-transitory computer-readable storage medium storing instructions that, when executed by the processor, cause the apparatus to perform:
    detecting, in a process of displaying a current article, an operation gesture of a user for selecting user specified content in the current article;
    obtaining coordinates of the user specified content on a current page and coordinates of the current page with respect to all pages of the current article;
    according to the coordinates of the user specified content and the coordinates of the current page, positioning, in a DOM tree representing all the pages occupied by the article, a DOM node containing the user specified content, the positioning the DOM node comprising:
        searching the DOM tree for an ID of a DOM node containing a sentence of the user specified content; and
        in response to the DOM node containing the sentence having no ID, recursively searching one or more parent nodes until a DOM node having an ID is obtained;
    displaying, in response to the detection of the operation gesture, comment content at a neighboring location of the user specified content, the displaying comprising:
        inserting a new node at a neighboring location of the DOM node containing the user specified content; and
        inserting the comment content to the new node;
    hiding the comment content in response to the user finishing posting of the comment content; and sending the comment content and the coordinates of the user specified content to a server.

5. The apparatus according to claim 4, wherein the sending the comment content and the coordinates of the user specified content to a server comprises sending the comment content and the coordinates of the user specified content to the server by using a preset format, wherein the preset format comprises: a keyword identifier, a location identifier, and comment content, the location identifier defines the coordinates of the user specified content, and the keyword identifier defines that the comment content is comment content having the location identifier.

6. The apparatus according to claim 4, wherein the instructions further cause the apparatus to perform:
   obtaining a to-be-displayed article and second comment content of the to-be-displayed article from the server, wherein the second comment content of the to-be-displayed article corresponds to location information, and the location information defines a second location at which second user specified content corresponding to the second comment content of the to-be-displayed article is located with respect to all pages occupied by the to-be-displayed article;
   finding the second comment content from the location information of the to-be-displayed article;
   finding the second location from all the pages occupied by the to-be-displayed article and according to the location information corresponding to the found second comment content; and
   displaying the second comment content of the to-be-displayed article at the found second location;
   re-displaying the second comment content in response to the user re-selecting the second user specified content;
   detecting comment information related to a commenting operation performed by a second user on the current article displayed on a second client, wherein the comment information includes a third location at which a third user specified content in the article is located on all the pages occupied by the article, and third comment content posted by the second user for the third user specified content;
   requesting and receiving the comment information from the server; and
   displaying the third comment content corresponding to the third location.

7. The apparatus according to claim 6, wherein the second location is: a second DOM node that corresponds to the second user specified content corresponding to the comment content of the to-be-displayed article and that is in a second DOM tree of all the pages occupied by the to-be-displayed article; and
   the finding the second location from all the pages occupied by the to-be-displayed article and according to the location information corresponding to the found second comment content comprises finding the second DOM node from all the pages occupied by the to-be-displayed article and according to the location information corresponding to the found second comment content.

8. The apparatus according to claim 6, wherein the displaying the comment content of the to-be-displayed article at the found location comprises:
   inserting a second new node to a neighboring location of a second DOM node; and
   inserting the second comment content of the to-be-displayed article to the second new node for display.

9. The apparatus according to claim 6, wherein the second comment content corresponding to the location information comprises: a keyword identifier, a location identifier, and comment content of the to-be-displayed article, the location identifier defines the second location, and the keyword identifier defines that the second comment content of the to-be-displayed article is comment content having the location identifier; and
   the finding the second comment content comprises finding the second comment content according to the keyword identifier, and the second comment content comprises the location identifier.

* * * * *